United States Patent
Yamaguchi

(10) Patent No.: US 10,650,976 B2
(45) Date of Patent: May 12, 2020

(54) MULTILAYER CERAMIC CAPACITOR

(71) Applicant: Murata Manufacturing Co., Ltd., Nagaokakyo-shi, Kyoto-fu (JP)

(72) Inventor: Shinichi Yamaguchi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/578,440

(22) Filed: Sep. 23, 2019

(65) Prior Publication Data
US 2020/0020484 A1    Jan. 16, 2020

Related U.S. Application Data

(62) Division of application No. 15/873,012, filed on Jan. 17, 2018, now Pat. No. 10,468,192.

(30) Foreign Application Priority Data

Jan. 18, 2017  (JP) .................. 2017-007054

(51) Int. Cl.
| | |
|---|---|
| H01G 4/30 | (2006.01) |
| H01G 4/002 | (2006.01) |
| H01G 4/005 | (2006.01) |
| H01G 4/008 | (2006.01) |
| H01G 4/01 | (2006.01) |
| H01G 4/012 | (2006.01) |
| H01G 4/12 | (2006.01) |
| H01G 4/248 | (2006.01) |

(52) U.S. Cl.
CPC ............... H01G 4/30 (2013.01); H01G 4/012 (2013.01); H01G 4/1227 (2013.01); H01G 4/248 (2013.01)

(58) Field of Classification Search
CPC .......... H01G 4/005; H01G 4/30; H01G 4/008; H01G 4/01; H01G 4/012; H02G 4/002
USPC .... 361/321.1, 321.2, 321.3, 301.4, 303, 305
See application file for complete search history.

(56) References Cited

PUBLICATIONS

Yamaguchi, "Multilayer Ceramic Capacitor", U.S. Appl. No. 15/873,012, filed Jan. 17, 2018.

*Primary Examiner* — Arun Ramaswamy
(74) *Attorney, Agent, or Firm* — Keating & Bennett, LLP

(57) ABSTRACT

A multilayer ceramic capacitor includes a multilayer body including an inner layer section extending from an inner electrode positioned closest to a first principal surface of the multilayer body to an inner electrode positioned closest to a second principal surface of the multilayer body, and first and second principal surface-side outer layer sections positioned outside the inner layer section on the sides closer to the first and second principal surfaces, respectively. Sn is dissolved in a solid state in Ni of only the inner electrodes contacting the first and second principal surface-side outer layer sections, and a Sn content is not less than about 0.1 mol and not more than about 8.5 mol where a total of Ni and Sn in each of the inner electrodes contacting the first and second principal surface-side outer layer sections is 100 mol.

6 Claims, 3 Drawing Sheets

MULTILAYER CERAMIC CAPACITOR

CROSS REFERENCE TO RELATED APPLICATIONS

This application claims the benefit of priority to Japanese Patent Application No. 2017-007054 filed on Jan. 18, 2017. The entire contents of this application are hereby incorporated herein by reference.

BACKGROUND OF THE INVENTION

1. Field of the Invention

The present invention relates to a multilayer ceramic capacitor.

2. Description of the Related Art

Recently, a multilayer ceramic capacitor has been demanded to have a smaller size and a larger capacitance with the progress of electronics technology. To satisfy such a demand, a thickness of each of dielectric layers of the multilayer ceramic capacitor has been reduced. However, the intensity of an electric field applied to each layer is relatively increased with the reduction in thickness of the dielectric layer. Thus, improvements in durability and reliability under the application of a voltage are demanded.

A known multilayer ceramic capacitor includes a multilayer body including a plurality of laminated dielectric layers and a plurality of inner electrodes formed along interfaces between the dielectric layers, and outer electrodes formed on outer surfaces of the multilayer body and electrically connected to the inner electrodes (see Japanese Unexamined Patent Application Publication No. 11-283867). In the multilayer ceramic capacitor disclosed in Japanese Unexamined Patent Application Publication No. 11-283867, the inner electrodes include Ni as a main ingredient.

However, the multilayer ceramic capacitor disclosed in Japanese Unexamined Patent Application Publication No. 11-283867, in which the inner electrodes include Ni as a main ingredient, has a problem in that durability under the application of a high voltage is not yet sufficient to be satisfactorily adapted to the recent demand for further reduction of the size and increase of the capacitance.

SUMMARY OF THE INVENTION

Preferred embodiments of the present invention provide multilayer ceramic capacitors that have high durability and good dielectric characteristics even when a thickness of a dielectric layer is further reduced and a voltage with higher intensity of an electric field is applied.

A preferred embodiment of the present invention provides a multilayer ceramic capacitor including a multilayer body that includes a plurality of laminated dielectric layers, a first principal surface and a second principal surface opposing to each other in a lamination direction, a first lateral surface and a second lateral surface opposing to each other in a width direction perpendicular or substantially perpendicular to the lamination direction, and a first end surface and a second end surface opposing to each other in a length direction perpendicular or substantially perpendicular to the lamination direction and the width direction; first inner electrodes and second inner electrodes alternately laminated with the dielectric layers each interposed therebetween, and exposed respectively at the first end surface and the second end surface; and a first outer electrode connected to the first inner electrodes and disposed on the first end surface, and a second outer electrode connected to the second inner electrodes and disposed on the second end surface; wherein the multilayer body includes an inner layer section extending from the first inner electrode or the second inner electrode positioned closest to the first principal surface to the first inner electrode or the second inner electrode positioned closest to the second principal surface in the lamination direction; a first principal surface-side outer layer section that is positioned closer to the first principal surface, and that is defined by the dielectric layers positioned between the first principal surface and an outermost surface of the inner layer section on the side closer to the first principal surface; and a second principal surface-side outer layer section that is positioned closer to the second principal surface, and that is defined by the dielectric layers positioned between the second principal surface and an outermost surface of the inner layer section on the side closer to the second principal surface, wherein Sn is dissolved in a solid state in Ni of only the first and/or second inner electrodes positioned in the inner layer section and contacting the first principal surface-side outer layer section and the second principal surface-side outer layer section, and a Sn content is not less than about 0.1 mol and not more than about 8.5 mol where a total of Ni and Sn in each of the first and/or second inner electrodes contacting the first principal surface-side outer layer section and the second principal surface-side outer layer section is 100 mol.

In the multilayer ceramic capacitor according to the above-described preferred embodiment of the present invention, preferably, the Sn content is not less than about 1.0 mol and not more than about 8.5 mol where the total of Ni and Sn in each of the first and/or second inner electrodes contacting the first principal surface-side outer layer section and the second principal surface-side outer layer section is 100 mol.

Another preferred embodiment of the present invention provides a multilayer ceramic capacitor including a multilayer body that includes a plurality of laminated dielectric layers, a first principal surface and a second principal surface opposing to each other in a lamination direction, a first lateral surface and a second lateral surface opposing to each other in a width direction perpendicular or substantially perpendicular to the lamination direction, and a first end surface and a second end surface opposing to each other in a length direction perpendicular or substantially perpendicular to the lamination direction and the width direction; first inner electrodes and second inner electrodes alternately laminated with the dielectric layers each interposed therebetween, and exposed respectively at the first end surface and the second end surface; and a first outer electrode connected to the first inner electrodes and disposed on the first end surface, and a second outer electrode connected to the second inner electrodes and disposed on the second end surface, wherein the multilayer body includes an inner layer section extending from the first inner electrode or the second inner electrode positioned closest to the first principal surface to the first inner electrode or the second inner electrode positioned closest to the second principal surface in the lamination direction; a first lateral surface-side outer layer section that is positioned closer to the first lateral surface, and that is defined by a dielectric layer positioned between the first lateral surface and an outermost surface of the inner layer section on the side closer to the first lateral surface; and a second lateral surface-side outer layer section that is positioned closer to the second lateral surface, and that is defined by a dielectric layer positioned between the second lateral surface and an outermost surface of the inner layer section on the side closer to the second lateral surface, wherein Sn is dissolved in a solid state in Ni of only the first inner electrodes and the second inner electrodes positioned in the inner layer section within a region extending about 5 μm along the width direction from the outermost surface of the inner layer section on the side closer to the first lateral surface and within a region extending about 5 μm along the width direction from the outermost surface of the inner layer section on the side closer to the second lateral surface, and a Sn content is not less than about 0.1 mol and not more than about 8.5 mol where a total of Ni and Sn in each of the first inner electrodes and the second inner electrodes within the region extending about 5 μm along the width direction from the outermost surface of the inner layer section on the side closer to the first lateral surface and within the region extending about 5 μm along the width direction from the outermost surface of the inner layer section on the side closer to the second lateral surface is 100 mol.

In the multilayer ceramic capacitor according to the above-described preferred embodiment of the present invention, preferably, the Sn content is not less than about 1.0 mol and not more than about 8.5 mol where the total of Ni and Sn in each of the first inner electrodes and the second inner electrodes within the region extending about 5 μm along the width direction from the outermost surface of the inner layer section on the side closer to the first lateral surface and within the region extending about 5 μm along the width direction from the outermost surface of the inner layer section on the side closer to the second lateral surface is 100 mol.

Another preferred embodiment of the present invention provides a multilayer ceramic capacitor including a multilayer body that includes a plurality of laminated dielectric layers, a first principal surface and a second principal surface opposing to each other in a lamination direction, a first lateral surface and a second lateral surface opposing to each other in a width direction perpendicular or substantially perpendicular to the lamination direction, and a first end surface and a second end surface opposing to each other in a length direction perpendicular or substantially perpendicular to the lamination direction and the width direction; first inner electrodes and second inner electrodes alternately laminated with the dielectric layers each interposed therebetween, and exposed respectively at the first end surface and the second end surface; and a first outer electrode connected to the first inner electrodes and disposed on the first end surface, and a second outer electrode connected to the second inner electrodes and disposed on the second end surface, wherein the multilayer body includes an inner layer section extending from the first inner electrode or the second inner electrode positioned closest to the first principal surface up to the first inner electrode or the second inner electrode positioned closest to the second principal surface in the lamination direction; a first principal surface-side outer layer section that is positioned closer to the first principal surface, and that is defined by the dielectric layers positioned between the first principal surface and an outermost surface of the inner layer section on the side closer to the first principal surface; a second principal surface-side outer layer section that is positioned closer to the second principal surface, and that is defined by the dielectric layers positioned between the second principal surface and an outermost surface of the inner layer section on the side closer to the second principal surface; a first lateral surface-side outer layer section that is positioned closer to the first lateral surface, and that is defined by a dielectric layer positioned between the first lateral surface and an outermost surface of the inner layer section on the side closer to the first lateral surface; and a second lateral surface-side outer layer section that is positioned closer to the second lateral surface, and that is defined by a dielectric layer positioned between the second lateral surface and an outermost surface of the inner layer section on the side closer to the second lateral surface, Sn is dissolved in a solid state in Ni of only the first and/or second inner electrodes positioned in the inner layer section and contacting the first principal surface-side outer layer section and the second principal surface-side outer layer section, as well as only the first inner electrodes and the second inner electrodes positioned in the inner layer section within a region extending about 5 μm along the width direction from the outermost surface of the inner layer section on the side closer to the first lateral surface and within a region extending about 5 μm along the width direction from the outermost surface of the inner layer section on the side closer to the second lateral surface, a Sn content is not less than about 0.1 mol and not more than about 8.5 mol where a total of Ni and Sn in each of the first and/or second inner electrodes contacting the first principal surface-side outer layer section and the second principal surface-side outer layer section is 100 mol, and a Sn content is not less than about 0.1 mol and not more than about 8.5 mol where a total of Ni and Sn in each of the first inner electrodes and the second inner electrodes within the region extending about 5 μm along the width direction from the outermost surface of the inner layer section on the side closer to the first lateral surface and within the region extending about 5 μm along the width direction from the outermost surface of the inner layer section on the side closer to the second lateral surface is 100 mol.

In the multilayer ceramic capacitor according to the above-described preferred embodiment of the present invention, preferably, the Sn content is not less than about 1.0 mol and not more than about 8.5 mol where the total of Ni and Sn in each of the first and/or second inner electrodes contacting the first principal surface-side outer layer section and the second principal surface-side outer layer section is 100 mol, and the Sn content is not less than about 1.0 mol and not more than about 8.5 mol where the total of Ni and Sn in each of the first inner electrodes and the second inner electrodes within the region extending about 5 μm along the width direction from the outermost surface of the inner layer section on the side closer to the first lateral surface and within the region extending about 5 μm along the width direction from the outermost surface of the inner layer section on the side closer to the second lateral surface is 100 mol.

With a multilayer ceramic capacitor according to a preferred embodiment of the present invention, since Sn is dissolved in a solid state in Ni of only the first and/or second inner electrodes positioned in the inner layer section and contacting the first principal surface-side outer layer section and the second principal surface-side outer layer section, and the Sn content is not less than about 0.1 mol and not more than about 8.5 mol where the total of Ni and Sn in each of the first and/or second inner electrodes contacting the first principal surface-side outer layer section and the second principal surface-side outer layer section is 100 mol, the first and/or second inner electrodes contacting the first principal surface-side outer layer section and the second principal surface-side outer layer section are changed to a Ni—Sn alloy. Thus, a state (height of an electrical barrier) at a ceramic-electrode interface is able to be changed, and a longer high temperature load life is achieved.

Moreover, with a multilayer ceramic capacitor according to a preferred embodiment of the present invention, when the Sn content is not less than about 1.0 mol and not more than about 8.5 mol where the total of Ni and Sn in each of the first and/or second inner electrodes contacting the first principal surface-side outer layer section and the second principal surface-side outer layer section is 100 mol, a portion of Ni is able to be replaced with Sn and changed to a Ni—Sn alloy, and physical properties (e.g., coefficient of linear expansion) in that portion are able to be changed. Therefore, the coefficient of linear expansion is made different between a central region of an effective layer (inner layer section) and a region of the effective layer (inner layer section) near an ineffective layer (outer layer section), such that a stress distribution inside the multilayer ceramic capacitor is able to be changed and an electrostatic capacitance is able to be increased.

With a multilayer ceramic capacitor according to a preferred embodiment of the present invention, since Sn is dissolved in a solid state in Ni of only the first inner electrodes and the second inner electrodes positioned in the inner layer section within the region extending about 5 μm along the width direction from the outermost surface of the inner layer section on the side closer to the first lateral surface and within the region extending about 5 μm along the width direction from the outermost surface of the inner layer section on the side closer to the second lateral surface, and since the Sn content is not less than about 0.1 mol and not more than about 8.5 mol where the total of Ni and Sn in each of the first inner electrodes and the second inner electrodes within the region extending about 5 μm along the width direction from the outermost surface of the inner layer section on the side closer to the first lateral surface and within the region extending about 5 μm along the width direction from the outermost surface of the inner layer section on the side closer to the second lateral surface is 100 mol, the first inner electrodes and the second inner electrodes within the region extending about 5 μm along the width direction from the outermost surface of the inner layer section on the side closer to the first lateral surface and within the region extending about 5 μm along the width direction from the outermost surface of the inner layer section on the side closer to the second lateral surface are changed to Ni—Sn alloys. Thus, a state (height of an electrical barrier) at the ceramic-electrode interface is able to be changed, and a longer high temperature load life is achieved.

Moreover, with a multilayer ceramic capacitor according to a preferred embodiment of the present invention, when the Sn content is not less than about 1.0 mol and not more than about 8.5 mol where the total of Ni and Sn in each of the first inner electrodes and the second inner electrodes within the region extending about 5 μm along the width direction from the outermost surface of the inner layer section on the side closer to the first lateral surface and within the region extending about 5 μm along the width direction from the outermost surface of the inner layer section on the side closer to the second lateral surface is 100 mol, a portion of Ni is able to be replaced with Sn and changed to a Ni—Sn alloy, and physical properties (e.g., coefficient of linear expansion) in that portion are able to be changed. Therefore, the coefficient of linear expansion is different between the central region of the effective layer (inner layer section) and the region of the effective layer (inner layer section) near the ineffective layer (outer layer section), such that the stress distribution inside the multilayer ceramic capacitor is able to be changed and the electrostatic capacitance is able to be increased.

With a multilayer ceramic capacitor according to a preferred embodiment of the present invention, since Sn is dissolved in a solid state in Ni of only the first and/or second inner electrodes positioned in the inner layer section and contacting the first principal surface-side outer layer section and the second principal surface-side outer layer section, and only the first inner electrodes and the second inner electrodes positioned in the inner layer section within the region extending about 5 μm along the width direction from the outermost surface of the inner layer section on the side closer to the first lateral surface and within the region extending about 5 μm along the width direction from the outermost surface of the inner layer section on the side closer to the second lateral surface, since the Sn content is not less than about 0.1 mol and not more than about 8.5 mol where the total of Ni and Sn in the each of the first and/or second inner electrodes contacting the first principal surface-side outer layer section and the second principal surface-side outer layer section is 100 mol, and since the Sn content is not less than about 0.1 mol and not more than about 8.5 mol where the total of Ni and Sn in each of the first inner electrodes and the second inner electrodes within the region extending about 5 μm along the width direction from the outermost surface of the inner layer section on the side closer to the first lateral surface and within the region extending about 5 μm along the width direction from the outermost surface of the inner layer section on the side closer to the second lateral surface is 100 mol, not only the first and/or second inner electrodes contacting the first principal surface-side outer layer section and the second principal surface-side outer layer section, but also the first inner electrodes and the second inner electrodes within the region extending about 5 μm along the width direction from the outermost surface of the inner layer section on the side closer to the first lateral surface and within the region extending about 5 μm along the width direction from the outermost surface of the inner layer section on the side closer to the second lateral surface are changed to Ni—Sn alloys. Thus, a state (height of an electrical barrier) at the ceramic-electrode interface is able to be changed, and a longer high temperature load life is achieved.

Moreover, with a multilayer ceramic capacitor according to a preferred embodiment of the present invention, when the Sn content is not less than about 1.0 mol and not more than about 8.5 mol where the total of Ni and Sn in each of the first and/or second inner electrodes contacting the first principal surface-side outer layer section and the second principal surface-side outer layer section is 100 mol, and when the Sn content is not less than about 1.0 mol and not more than about 8.5 mol where the total of Ni and Sn in each of the first inner electrodes and the second inner electrodes within the region extending about 5 μm along the width direction from the outermost surface of the inner layer section on the side closer to the first lateral surface and within the region extending about 5 μm along the width direction from the outermost surface of the inner layer section on the side closer to the second lateral surface is 100 mol, a portion of Ni is able to be replaced with Sn and changed to a Ni—Sn alloy, and physical properties (e.g., coefficient of linear expansion) in that portion are able to be changed. Therefore, the coefficient of linear expansion is made different between the central region of the effective layer (inner layer section) and the region of the effective layer (inner layer section) near the ineffective layer (outer layer section), such that the stress distribution inside the multilayer ceramic capacitor is able to be changed and the electrostatic capacitance is able to be increased.

According to preferred embodiments of the present invention, multilayer ceramic capacitors are able to be obtained which have high durability and good dielectric characteristics even when a thickness of each dielectric layer is further reduced and a voltage with higher intensity of an electric field is applied.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
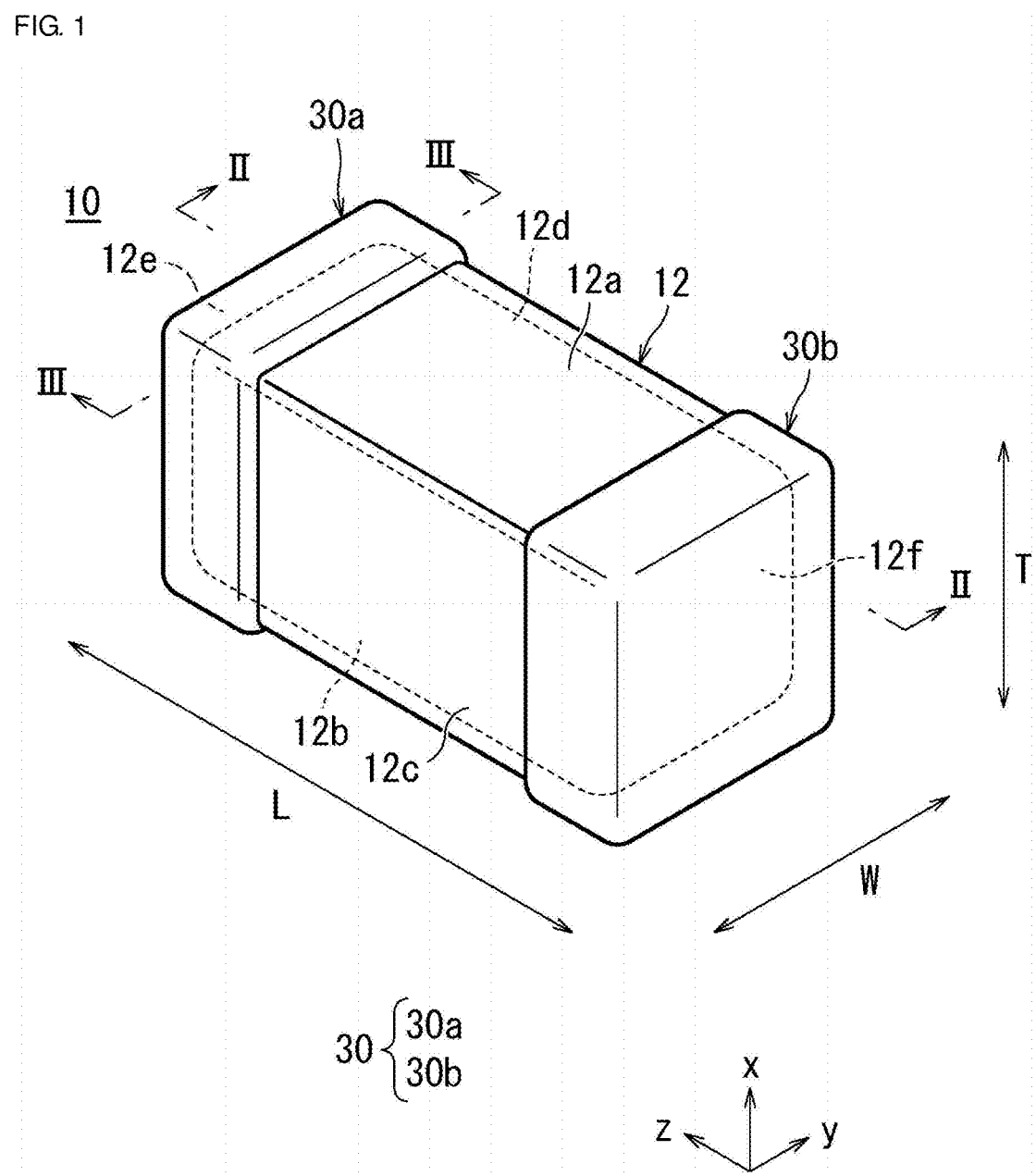
FIG. 1 is an external perspective view illustrating an example of a multilayer ceramic capacitor according to a preferred embodiment of the present invention.
Figure 2:
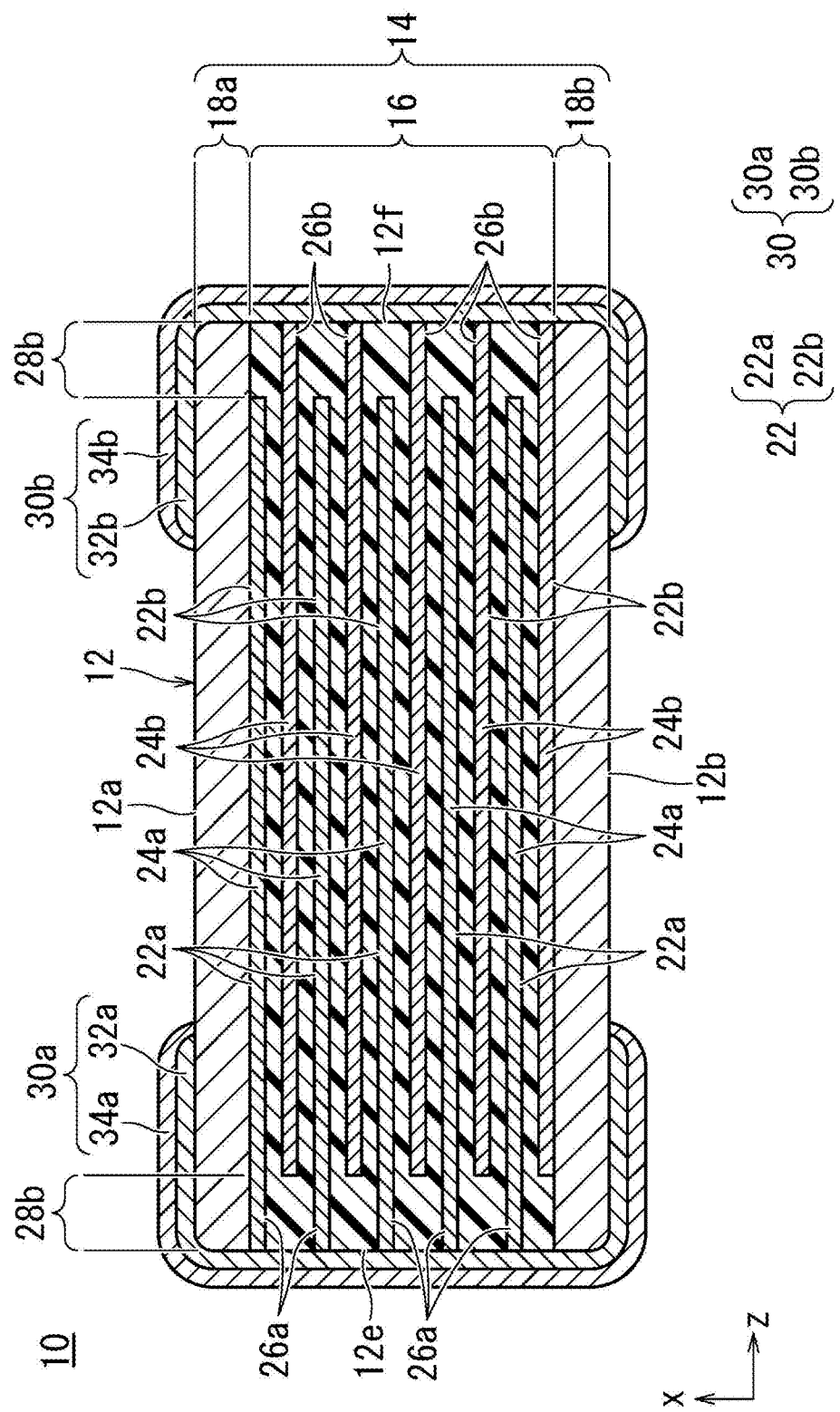
FIG. 2 is a sectional view, taken along a line II-II in FIG. 1, illustrating a multilayer ceramic capacitor according to a preferred embodiment of the present invention.
Figure 3:
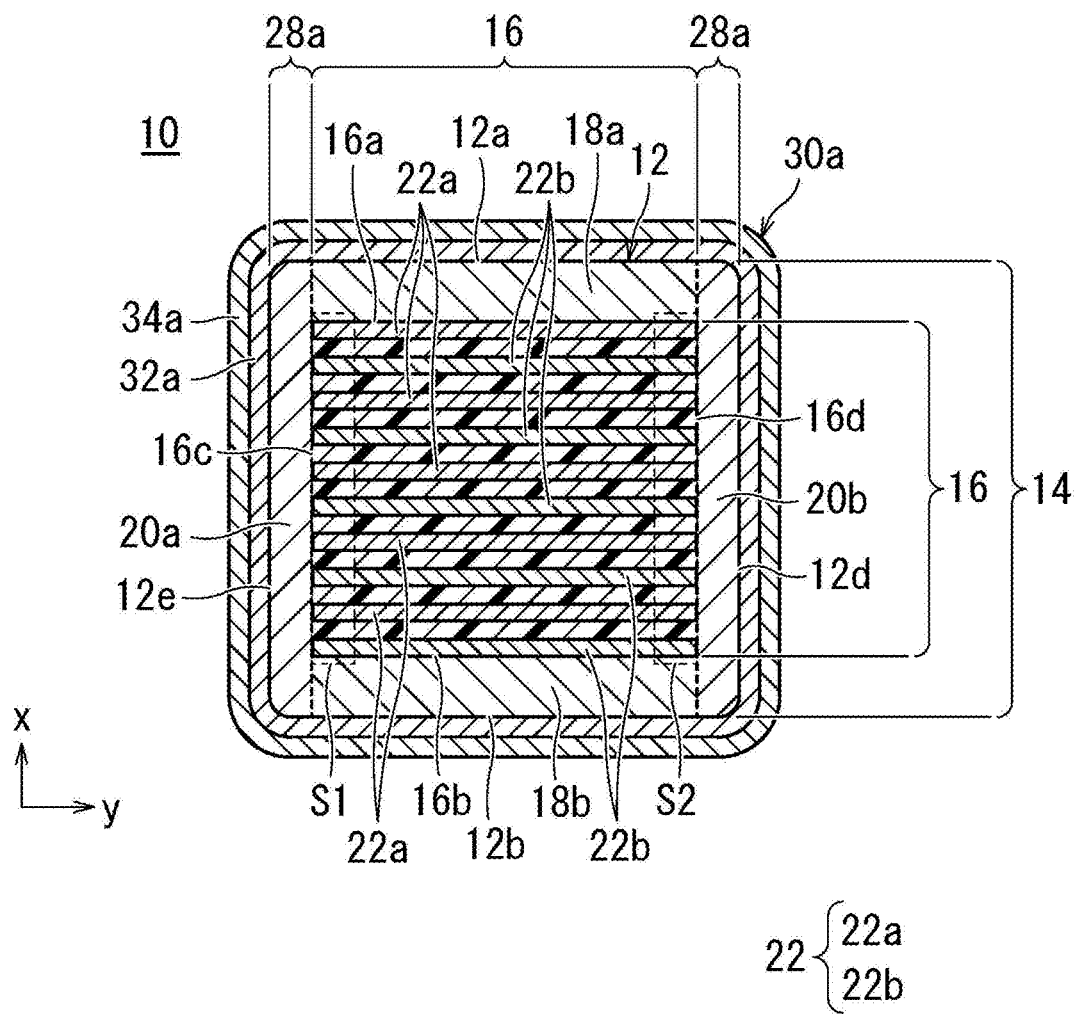
FIG. 3 is a sectional view, taken along a line III-III in FIG. 1, illustrating a multilayer ceramic capacitor according to a preferred embodiment of the present invention.

A multilayer ceramic capacitor according to a first preferred embodiment of the present invention will be described below. FIG. 1 is an external perspective view illustrating an example of a multilayer ceramic capacitor according to a first preferred embodiment of the present invention. FIG. 2 is a sectional view, taken along a line II-II in FIG. 1, illustrating the multilayer ceramic capacitor according to the first preferred embodiment of the present invention. FIG. 3 is a sectional view, taken along a line III-III in FIG. 1, illustrating the multilayer ceramic capacitor according to the first preferred embodiment of the present invention.

As illustrated in FIGS. 1 to 3, the multilayer ceramic capacitor 10 includes a multilayer body 12 having a rectangular or substantially rectangular parallelepiped shape.

The multilayer body 12 includes a plurality of laminated dielectric layers 14 and a plurality of laminated inner electrodes 22. The multilayer body 12 includes a first principal surface 12a and a second principal surface 12b opposing to each other in a lamination direction x, a first lateral surface 12c and a second lateral surface 12d opposing to each other in a width direction y perpendicular or substantially perpendicular to the lamination direction x, and a first end surface 12e and a second end surface 12f opposing to each other in a length direction z perpendicular or substantially perpendicular to the lamination direction x and the width direction y. Corners and ridges of the multilayer body 12 are preferably rounded. The word "corner" denotes a portion where three adjacent surfaces of the multilayer body intersect one another, and the word "ridge" denotes a portion where two adjacent surfaces of the multilayer body intersect each another. Projections and depressions, or other irregularities may be provided partially or entirely at the first principal surface 12a, the second principal surface 12b, the first lateral surface 12c, the first lateral surface 12d, the first end surface 12e, and the second end surface 12f. Furthermore, a size of the multilayer body 12 in the length direction z is not always required to be longer than that in the width direction y.

The multilayer body 12 includes an inner layer section 16 including the plurality of inner electrodes 22 from the inner electrode 22 positioned closest to the first principal surface 12a to the inner electrode 22 positioned closest to the second principal surface 12b in the lamination direction x of the multilayer body 12. Furthermore, the multilayer body 12 includes a first principal surface-side outer layer section 18a that is positioned closer to the first principal surface 12a, and that is defined by the dielectric layers 14 positioned between the first principal surface 12a and an outermost surface 16a of the inner layer section 16 on the side closer to the first principal surface 12a, and a second principal surface-side outer layer section 18b that is positioned closer to the second principal surface 12b, and that is defined by the dielectric layers 14 positioned between the second principal surface 12b and an outermost surface 16b of the inner layer section 16 on the side closer to the second principal surface 12b. Moreover, the multilayer body 12 includes a first lateral surface-side outer layer section 20a that is positioned closer to the first lateral surface 12c, and that is defined by the dielectric layers 14 positioned between the first lateral surface 12c and an outermost surface 16c of the inner layer section 16 on the side closer to the first lateral surface 12c, and a second lateral surface-side outer layer section 20b that is positioned closer to the second lateral surface 13d, and that is defined by the dielectric layers 14 positioned between the second lateral surface 12d and an outermost surface 16d of the inner layer section 16 on the side closer to the second lateral surface 12d. Thus, outer layer sections of the multilayer body 12 are defined by the first principal surface-side outer layer section 18a, the second principal surface-side outer layer section 18b, the first lateral surface-side outer layer section 20a, and the second lateral surface-side outer layer section 20b.

The dielectric layers 14 may preferably be made of a dielectric material, for example. Powder of the dielectric material of the dielectric layer 14 preferably includes, as a main ingredient, a perovskite oxide containing Ba and Ti, for example. This type of dielectric material may preferably be a dielectric ceramic including $BaTiO_3$, for example. When including the above-mentioned dielectric material as a main ingredient, the piezoelectric ceramic may preferably include accessory ingredients, such as a Mn compound, a Fe compound, a Cr compound, a Co compound, and a Ni compound, for example, at a content smaller than that of the main ingredient depending on desired characteristics of an electronic component body, i.e., the multilayer body 12.

A thickness of one dielectric layer 14 after firing is preferably not less than about 0.5 μm and not more than about 2.5 μm, for example.

The multilayer body 12 includes, as the plurality of inner electrodes 22, a plurality of first inner electrodes 22a and a plurality of second inner electrodes 22b each having a rectangular or substantially rectangular shape. The plurality of first inner electrodes 22a and the plurality of second inner electrodes 22b are embedded in the multilayer body 12 in a state of being alternately arranged at equal or substantially equal intervals therebetween in the lamination direction x.

The first inner electrode 22a includes a first opposing electrode portion 24a opposing to the second inner electrode 22b, and a first lead-out electrode portion 26a that is positioned closer to one end of the first inner electrode 22a, and that extends to the first end surface 12e of the multilayer body 12.

The second inner electrode 22b includes a second opposing electrode portion 24b opposing to the first inner electrode 22a, and a second lead-out electrode portion 26b that is positioned closer to one end of the second inner electrode 22b, and that extends to the second end surface 12f of the multilayer body 12.

The multilayer body 12 includes lateral portions (called "W gaps" hereinafter) 28a that are provided in the multilayer body 12 between each of one-side ends of the first opposing electrode portion 24a and the second opposing electrode portion 24b in the width direction y and the first lateral surface 12c, and between each of the other-side ends of the first opposing electrode portion 24a and the second opposing electrode portion 24b in the width direction y and the second lateral surface 12d. The multilayer body 12 further includes end portions (called "L gaps" hereinafter) 28b, which are provided in the multilayer body 12 between each of end portions of the first inner electrodes 22a on the side opposite to the first lead-out electrode portion 26a and the second end surface 12f, and between each of end portions of the second inner electrodes 22b on the side opposite to the second lead-out electrode portion 26b and the first end surface 12e.

The inner electrodes 22 each preferably include Ni as a main ingredient, for example.

Sn is dissolved in a solid state in Ni of the inner electrode 22 (i.e., the first inner electrode 22a or the second inner electrode 22b) positioned in the inner layer section 16 and contacting the first principal surface-side outer layer section 18a. Assuming a total of Ni and Sn in the inner electrode 22 contacting the first principal surface-side outer layer section 18a to be 100 mol, the Sn content is preferably not less than about 0.1 mol and not more than about 8.5 mol, for example. More preferably, the Sn content is not less than about 1.0 mol and not more than about 8.5 mol, for example, where the total of Ni and Sn in the inner electrode 22 contacting the first principal surface-side outer layer section 18a is 100 mol.

Furthermore, Sn is dissolved in a solid state in Ni of the inner electrode 22 (i.e., the first inner electrode 22a or the second inner electrode 22b) positioned in the inner layer section 16 and contacting the second principal surface-side outer layer section 18b. Assuming a total of Ni and Sn in the inner electrode contacting the second principal surface-side outer layer section 18b to be 100 mol, the Sn content is preferably not less than about 0.1 mol and not more than about 8.5 mol, for example. More preferably, the Sn content is not less than about 1.0 mol and not more than about 8.5 mol, for example, where the total of Ni and Sn in the inner electrode 22 contacting the second principal surface-side outer layer section 18b is 100 mol.

On the other hand, assuming a total of Ni and Sn in the inner electrode 22 within a region S1 and a region S2 to be 100 mol, the Sn content may preferably be less than about 0.1 mol, the region S1 extending about 5 μm along the width direction y from the first lateral surface-side outer layer section 20a (i.e., from the outermost surface 16c of the inner layer section 16 on the side closer to the first lateral surface 12c) in a middle one of three zones resulting from dividing the inner layer section 16 into three equal or substantially equal portions in the lamination direction x, the region S2 extending about 5 μm along the width direction y from the second lateral surface-side outer layer section 20b (i.e., from the outermost surface 16d of the inner layer section 16 on the side closer to the second lateral surface 12d) in a middle one of the three zones resulting from dividing the inner layer section 16 into three equal or substantially equal portions in the lamination direction x.

The inner electrode 22 may further include dielectric particles having the same composition series as the ceramic included in the dielectric layer 14.

A thickness of the inner electrode 22 is preferably not less than about 0.2 μm and not more than about 2.0 μm, for example. The number of the inner electrodes 22 is not limited to particular number.

An outer electrode 30 is located outside the first end surface 12e and the second end surface 12f of the multilayer body 12. The outer electrode 30 includes a first outer electrode 30a and a second outer electrode 30b.

The first outer electrode 30a is located on the first end surface 12e of the multilayer body 12. In this case, the first outer electrode 30a is electrically connected to the first lead-out electrode portions 26a of the first inner electrodes 22a. The first outer electrode 30a preferably covers the first end surface 12e of the multilayer body 12 and extends from the first end surface 12e to cover respective portions of the first principal surface 12a, the second principal surface 12b, the first lateral surface 12c, and the second lateral surface 12d.

The second outer electrode 30b is located on the second end surface 12f of the multilayer body 12. In this case, the second outer electrode 30b is electrically connected to the second lead-out electrode portions 26b of the second inner electrodes 22b. The second outer electrode 30b preferably covers the second end surface 12f of the multilayer body 12 and extends from the second end surface 12f to cover respective parts of the first principal surface 12a, the second principal surface 12b, the first lateral surface 12c, and the second lateral surface 12d.

In the multilayer body 12, an electrostatic capacitance is produced by the first opposing electrode portions 24a of the first inner electrodes 22a and the second opposing electrode portions 24b of the second inner electrodes 22b, these electrode portions being opposed to each other with the dielectric layer 14 interposed therebetween. Thus, it is possible to obtain an electrostatic capacitance and to develop capacitor characteristics between the first outer electrode 30a to which the first inner electrodes 22a are connected and the second outer electrode 30b to which the second inner electrode 22b are connected.

The first outer electrode 30a preferably includes a first underlying electrode layer 32a, and a first plating layer 34a arranged on a surface of the first underlying electrode layer 32a. Similarly, the second outer electrode 30b preferably includes a second underlying electrode layer 32b, and a second plating layer 34b arranged on a surface of the second underlying electrode layer 32b.

The first underlying electrode layer 32a is provided on the first end surface 12e of the multilayer body 12 and extends from the first end surface 12e to cover the respective portions of the first principal surface 12a, the second principal surface 12b, the first lateral surface 12c, and the second lateral surface 12d.

The second underlying electrode layer 32b is provided on the second end surface 12f of the multilayer body 12 and extends from the second end surface 12f to cover the respective portions of the first principal surface 12a, the second principal surface 12b, the first lateral surface 12c, and the second lateral surface 12d.

The first underlying electrode layer 32a may be provided only on the first end surface 12e of the multilayer body 12, and the second underlying electrode layer 32b may be provided only on the second end surface 12f of the multilayer body 12.

Each of the first underlying electrode layer 32a and the second underlying electrode layer 32b (also simply referred to as the "underlying electrode layer" hereinafter) includes a conductive metal and glass, for example. The metal in the underlying electrode layer preferably includes at least one selected from among Cu, Ni, Ag, Pd, an Ag—Pd alloy, and Au, for example. The glass in the underlying electrode layer preferably includes at least one selected from among B, Si, Ba, Mg, Al, Li, and other suitable materials, for example. The underlying electrode layer may include a plurality of layers. The underlying electrode layer is preferably formed, for example, by coating a conductive paste, which includes the glass and the metal, over the multilayer body 12, and by baking the coated conductive paste. The underlying electrode layer may be baked at the same time as firing the dielectric layers 14 and the inner electrodes 22, or may be baked after firing the dielectric layers 14 and the inner electrodes 22. A thickness of a thickest portion of the underlying electrode layer is not limited to a particular value, but it is preferably not less than about 10 μm and not more than about 50 μm, for example.

The first plating layer 34a covers the first underlying electrode layer 32a. In more detail, the first plating layer 34a is preferably provided on a surface of the first underlying electrode layer 32a to cover not only a region positioned on the first end surface 12e, but also regions positioned on the first principal surface 12a, the second principal surface 12b, the first lateral surface 12c, and the second lateral surface 12d. The first plating layer 34a may be provided on the surface of the first underlying electrode layer 32a only in the region positioned on the first end surface 12e.

Similarly, the second plating layer 34b covers the second underlying electrode layer 32b. In more detail, the second plating layer 34b is preferably provided on a surface of the second underlying electrode layer 32b to cover not only a region positioned on the second end surface 12f, but also regions positioned on the first principal surface 12a, the second principal surface 12b, the first lateral surface 12c, and the second lateral surface 12d. The second plating layer 34b may be provided on the surface of the second underlying electrode layer 32b only in the region positioned on the second end surface 12f.

The first plating layer 34a and the second plating layer 34b (also simply referred to as a "plating layer" hereinafter) may be preferably made of at least one of metals selected from among Cu, Ni, Sn, Ag, Pd, an Ag—Pd alloy, and Au, for example, or an alloy containing the selected metal.

The plating layer may include a plurality of layers. In that case, the plating layer is preferably a two-layer structure including a Ni plating layer and a Sn plating layer, for example. With the presence of the Ni plating layer covering the surface of the underlying electrode layer, when mounting the multilayer ceramic capacitor 10, the underlying electrode layer is prevented from being eroded by a solder used in mounting work. Furthermore, with the presence of the Sn plating layer disposed on a surface of the Ni plating layer, when mounting the multilayer ceramic capacitor 10, wetting properties of the solder used in the mounting work are improved and the mounting work is facilitated.

A thickness of one plating layer is preferably not less than about 1 μm and not more than about 15 μm, for example.

It is assumed that a size of the multilayer ceramic capacitor 10 in the length direction z, including the multilayer body 12, the first outer electrode 30a, and the second outer electrode 30b, is called an L size, a size of the multilayer ceramic capacitor 10 in the lamination direction x, including the multilayer body 12, the first outer electrode 30a, and the second outer electrode 30b, is called a T size, and a size of the multilayer ceramic capacitor 10 in the width direction y, including the multilayer body 12, the first outer electrode 30a and the second outer electrode 30b, is called a W size.

The sizes of the multilayer ceramic capacitor 10 are not limited to any particular sizes, but preferably, the L size in the length direction z is not less than about 0.2 mm and not more than about 3.2 mm, the W size in the width direction y is not less than about 0.1 mm and not more than about 2.5 mm, and the T size in the lamination direction x is not less than about 0.1 mm and not more than about 2.5 mm, for example. It is to be noted that the L size in the length direction z is not always required to be longer than the W size in the width direction y. The sizes of the multilayer ceramic capacitor 10 may be measured with a microscope.

Thus, the multilayer ceramic capacitor 10 according to the present preferred embodiment includes the following features. Sn is dissolved in a solid state in Ni of the inner electrode 22 positioned in the inner layer section 16 and contacting the first principal surface-side outer layer section 18a, and the Sn content is preferably not less than about 0.1 mol and not more than about 8.5 mol, for example, where the total of Ni and Sn in the inner electrode 22 contacting the first principal surface-side outer layer section 18a is 100 mol. Furthermore, Sn is dissolved in a solid state in Ni of the inner electrode 22 positioned in the inner layer section 16 and contacting the second principal surface-side outer layer section 18b, and the Sn content is preferably not less than about 0.1 mol and not more than about 8.5 mol, for example, where the total of Ni and Sn in the inner electrode 22 contacting the second principal surface-side outer layer section 18b is 100 mol. With these features, since the inner electrodes 22 contacting the first principal surface-side outer layer section 18a and the second principal surface-side outer layer section 18b are changed to Ni—Sn alloys, a state (height of an electrical barrier) at the ceramic-electrode interface is able to be changed, and a longer high temperature load life is achieved. The reason is presumably that, because failures found in a high temperature loading test of the multilayer ceramic capacitor occur at the end portions of the inner electrodes 22 in an effective layer (inner layer section) in many cases, the high temperature load life in the entirety of the multilayer ceramic capacitor is prolonged by prolonging the high temperature load life in the end portions.

Moreover, the multilayer ceramic capacitor 10 according to the present preferred embodiment includes the following features. The Sn content is preferably not less than about 1.0 mol and not more than about 8.5 mol, for example, where the total of Ni and Sn in the inner electrode 22 contacting the first principal surface-side outer layer section 18a is 100 mol, and the Sn content is preferably not less than about 1.0 mol and not more than about 8.5 mol, for example, where the total of Ni and Sn in the inner electrode 22 contacting the second principal surface-side outer layer section 18b is 100 mol. With these features, the following advantageous effect is obtained in addition to the above-described advantageous effect. A portion of Ni is able to be replaced with Sn and changed to a Ni—Sn alloy, and physical properties (e.g., coefficient of linear expansion) in that portion are changed. Therefore, the coefficient of linear expansion is made different between a central region of the effective layer (inner layer section) and a region of the effective layer (inner layer section) near an ineffective layer (outer layer section), such that a stress distribution inside the multilayer ceramic capacitor 10 is able to be changed and the electrostatic capacitance is able to be increased. As a result, it is possible to achieve a longer high temperature load life and a larger electrostatic capacitance at the same time.

One non-limiting example of a manufacturing method for a multilayer ceramic capacitor according to the first preferred embodiment will be described below.

First, $BaTiO_3$ powder as a main ingredient is prepared. More specifically, the $BaTiO_3$ powder as the main ingredient is obtained by weighing $BaCO_3$ powder and $TiO_2$ powder in predetermined amounts, mixing the powders for a certain amount of time with a ball mill, and then performing heat treatment on the mixture.

The dielectric material powder used for the dielectric layers 14 preferably includes, as the main ingredient, a perovskite oxide containing Ba and Ti, for example.

Next, powders of $Dy_2O_3$, MgO, MnO, and $SiO_2$ as accessory ingredients are prepared. The powders are then weighed as follows: $Dy_2O_3$ is about 0.75 mol parts, MgO is about 1 mol part, MnO is about 0.2 mol parts, and $SiO_2$ is about 1 mol part with respect to 100 mol parts of $BaTiO_3$ as the main ingredient. Raw material powder 1 is obtained by blending the powders with the $BaTiO_3$ powder as the main ingredient, mixing them for a certain amount of time with a ball mill, drying the mixture, and pulverizing the mixture in a dry state.

Furthermore, $SnO_2$ power is prepared in addition to the powders of $Dy_2O_3$, MgO, MnO, and $SiO_2$ as the accessory ingredients. The powders are then weighed as follows: $Dy_2O_3$ is about 0.75 mol parts, MgO is about 1 mol part, MnO is about 0.2 mol parts, and $SiO_2$ is about 1 mol part with respect to 100 mol parts of $BaTiO_3$ as the main ingredient, and regarding $SnO_2$, a ratio of $SnO_2/BaTiO_3$ is not less than about 0.06 wt % and not more than about 1.25 wt %. Raw material powder 2 is obtained by blending those powders with the $BaTiO_3$ powder as the main ingredient, mixing them for a certain amount of time with a ball mill, drying the mixture, and pulverizing the mixture in a dry state.

Next, ceramic slurry is prepared by adding a polyvinylbutyral-based binder and an organic solvent, such as ethanol, to the raw material powder 1, and mixing them in a wet state with a ball mill. A ceramic green sheet 1 not including $SnO_2$ and having a thickness of about 2.8 μm, for example, is obtained by shaping the ceramic slurry into a sheet with a doctor blade method.

Similarly, ceramic slurry is prepared by adding a polyvinylbutyral-based binder and an organic solvent, such as ethanol, to the raw material powder 2, and mixing them in a wet state with a ball mill. A ceramic green sheet 2 8 including $SnO_2$ and having a thickness of about 2.8 μm, for example, is obtained by shaping the ceramic slurry into a sheet with the doctor blade method.

Next, an inner-electrode conductive paste, which is used to form the inner electrode 22, is prepared. The inner-electrode conductive paste is obtained by preparing Ni powder as conductive powder, adding a polyvinylbutyral-based binder and an organic solvent, such as ethanol, to the Ni powder, and mixing them in a wet state with a ball mill.

Subsequently, the prepared inner-electrode conductive paste is applied to a surface of the ceramic green sheet 1, such that an inner electrode pattern is formed. The inner-electrode conductive paste may be applied by any of the known methods, such as screen printing and gravure printing, for example.

Next, a predetermined number (e.g., 50) of the ceramic green sheets 2, each not including the inner electrode pattern formed thereon, are stacked. On a stack of the ceramic green sheets 2, a predetermined number (e.g., 301) of the ceramic green sheets 1, each including the inner electrode pattern formed thereon, are stacked such that the regions where the inner electrode patterns extend outward are arranged to be alternately positioned on the opposite sides. On a stack of those ceramic green sheets 1 and 2, a predetermined number (e.g., 50) of the ceramic green sheets 2, each not including the inner electrode pattern formed thereon, are further stacked. A multilayer body block is thus fabricated. The multilayer body block may be subjected, when needed, to pressure bonding in the lamination direction with an appropriate apparatus, such as an isostatic press, for example.

Thereafter, the multilayer body block is cut into a predetermined shape with predetermined sizes, and a multilayer body chip in a not-yet-fired state is obtained by the cutting. When cutting the multilayer body block to obtain the multilayer body chip, a cut position is adjusted such that the W gap after firing has a thickness of about 100 μm, for example. At that time, corners and ridges of the multilayer body may be rounded by barrel polishing, for example.

Subsequently, the cut multilayer body chip in the not-yet-fired state is heated to about 350° C. in a $N_2$ atmosphere, for example, to burn out the binder. Thereafter, the multilayer body chip is heated at a rate of about 20° C./min and fired at about 1200° C. for about 20 minutes in a reducing atmosphere of $H_2$—$N_2$—$H_2O$ gas in which an oxygen partial pressure is not lower than about $10^{-10}$ MPa and not higher than about $10^{-12}$ MPa, for example.

Next, a conductive paste for the outer electrode is coated over both of the end surfaces of the multilayer body 12 after the firing and then baked. Thus, the first underlying electrode layer 32*a* of the first outer electrode 30*a* electrically connected to the first inner electrodes 22*a*, and the second underlying electrode layer 32*b* of the second outer electrode 30*b* electrically connected to the second inner electrodes 22*b* are formed. The conductive paste for the outer electrode is preferably, for example, a Cu paste including $B_2O_3$—$SiO_2$—BaO based glass frit. The baking is performed at about 600° C. in a $N_2$ atmosphere, for example.

Subsequently, when needed, the first plating layer 34*a* is formed to cover the first underlying electrode layer 32*a*, and the second plating layer 34*b* is formed to cover the second underlying electrode layer 32*b*.

When the first plating layer 34*a* and the second plating layer 34*b* are formed as Ni plating layers, an electrolytic plating method, for example, is preferably used to form these layers.

When the first plating layer 34*a* and the second plating layer 34*b* are each formed in a two-layer structure, a Sn plating layer is formed, as required, on a surface of a Ni plating layer.

The multilayer ceramic capacitor 10 according to the first preferred embodiment is manufactured as described above.

Second Preferred Embodiment

A multilayer ceramic capacitor according to a second preferred embodiment of the present invention will be described below. The multilayer ceramic capacitor 10 according to the second preferred embodiment has a similar structure to that of the multilayer ceramic capacitor 10 according to the first preferred embodiment, described above with reference to FIGS. 1 to 3, except for a presence state of Sn in the inner electrode 22. Therefore, description is omitted regarding the same structure as that of the multilayer ceramic capacitor 10 according to the first preferred embodiment.

In the multilayer ceramic capacitor 10 according to the second preferred embodiment, Sn is dissolved in a solid state in Ni of the inner electrode 22 (i.e., each of the first inner electrode 22a and the second inner electrode 22b) positioned in the inner layer section 16 within the region S1 extending about 5 μm along the width direction y from the outermost surface 16c of the inner layer section 16 on the side closer to the first lateral surface 12c. Assuming that a total of Ni and Sn in the inner electrode 22 within the region S1 extending about 5 μm along the width direction y from the outermost surface 16c of the inner layer section 16 on the side closer to the first lateral surface 12c is 100 mol, the Sn content is preferably not less than about 0.1 mol and not more than about 8.5 mol, for example. More preferably, the Sn content is not less than about 1.0 mol and not more than about 8.5 mol, for example, where the total of Ni and Sn in the inner electrode 22 within the region S1 extending about 5 μm along the width direction y from the outermost surface 16c of the inner layer section 16 on the side closer to the first lateral surface 12c is 100 mol.

Furthermore, Sn is dissolved in a solid state in Ni of the inner electrode 22 (i.e., each of the first inner electrode 22a and the second inner electrode 22b) positioned in the inner layer section 16 within the region S2 extending about 5 μm along the width direction y from the outermost surface 16d of the inner layer section 16 on the side closer to the second lateral surface 12d. Assuming that a total of Ni and Sn in the inner electrode 22 within the region S2 extending about 5 μm along the width direction y from the outermost surface 16d of the inner layer section 16 on the side closer to the second lateral surface 12d is 100 mol, the Sn content is preferably not less than about 0.1 mol and not more than about 8.5 mol, for example. More preferably, the Sn content is not less than about 1.0 mol and not more than about 8.5 mol, for example, where the total of Ni and Sn in the inner electrode within the region S2 extending about 5 μm along the width direction y from the outermost surface 16d of the inner layer section 16 on the side closer to the second lateral surface 12d is 100 mol.

Thus, the multilayer ceramic capacitor 10 according to the second preferred embodiment includes the following features. Sn is dissolved in a solid state in Ni of the inner electrode 22 (i.e., each of the first inner electrode 22a and the second inner electrode 22b) positioned in the inner layer section 16 within the region S1 extending about 5 μm along the width direction y from the outermost surface 16c of the inner layer section 16 on the side closer to the first lateral surface 12c. The Sn content is preferably not less than about 0.1 mol and not more than about 8.5 mol, for example, where the total of Ni and Sn in the inner electrode 22 within the region S1 extending about 5 μm along the width direction y from the outermost surface 16c of the inner layer section 16 on the side closer to the first lateral surface 12c is 100 mol. Furthermore, Sn is dissolved in a solid state in Ni of the inner electrode 22 (i.e., each of the first inner electrode 22a and the second inner electrode 22b) positioned in the inner layer section 16 within the region S2 extending about 5 μm along the width direction y from the outermost surface 16d of the inner layer section 16 on the side closer to the second lateral surface 12d. The Sn content is preferably not less than about 0.1 mol and not more than about 8.5 mol, for example, where the total of Ni and Sn in the inner electrode 22 within the region S2 extending about 5 μm along the width direction y from the outermost surface 16d of the inner layer section 16 on the side closer to the second lateral surface 12d is 100 mol. With these features, since the inner electrodes 22 within the regions extending about 5 μm along the width direction y from the outermost surfaces of the inner layer section 16 on the sides closer to the first lateral surface 12c and the second lateral surface 12d are changed to Ni—Sn alloys, a state (height of an electrical barrier) at the ceramic-electrode interface is able to be changed, and a longer high temperature load life is achieved. The reason is presumably that, because failures found in a high temperature loading test of the multilayer ceramic capacitor occur at the end portions of the inner electrodes 22 in the effective layer (inner layer section) in many cases, the high temperature load life in the entirety of the multilayer ceramic capacitor is prolonged by prolonging the high temperature load life in the end portions.

Moreover, the multilayer ceramic capacitor 10 according to the second preferred embodiment includes the following features. The Sn content is preferably not less than about 1.0 mol and not more than about 8.5 mol, for example, where the total of Ni and Sn in the inner electrode 22 within the region S1 extending about 5 μm along the width direction y from the outermost surface 16c of the inner layer section 16 on the side closer to the first lateral surface 12c is 100 mol, and the Sn content is preferably not less than about 1.0 mol and not more than about 8.5 mol, for example, where the total of Ni and Sn in the inner electrode 22 within the region S2 extending about 5 μm along the width direction y from the outermost surface 16d of the inner layer section 16 on the side closer to the second lateral surface 12d is 100 mol. With these features, the following advantageous effect is obtained in addition to the above-described advantageous effect. A portion of Ni is able to be replaced with Sn and changed to a Ni—Sn alloy, and physical properties (e.g., coefficient of linear expansion) in that portion are able be changed. Therefore, the coefficient of linear expansion is made different between the central region of the effective layer (inner layer section) and the region of the effective layer (inner layer section) near the ineffective layer (outer layer section), such that the stress distribution inside the multilayer ceramic capacitor 10 is changed and the electrostatic capacitance is increased. As a result, it is possible to achieve a longer high temperature load life and a larger electrostatic capacitance at the same time.

One non-limiting example of a manufacturing method for the above-described multilayer ceramic capacitor according to the second preferred embodiment will be described below.

First, $BaTiO_3$ powder as a main ingredient is prepared. More specifically, the $BaTiO_3$ powder as the main ingredient is obtained by weighing $BaCO_3$ powder and $TiO_2$ powder in predetermined amounts, mixing the powders for a certain amount of time with a ball mill, and then performing heat treatment on the mixture.

The dielectric material powder used for the dielectric layers 14 preferably includes, as the main ingredient, a perovskite oxide containing Ba and Ti, for example.

Next, powders of $Dy_2O_3$, MgO, MnO, and $SiO_2$ as accessory ingredients are prepared. The powders are then weighed as follows: $Dy_2O_3$ is about 0.75 mol parts, MgO is about 1 mol part, MnO is about 0.2 mol parts, and $SiO_2$ is about 1 mol part with respect to 100 mol parts of $BaTiO_3$ as the main ingredient. Raw material powder 1 is obtained by blending the powders with the $BaTiO_3$ powder as the main ingredient, mixing them for a certain amount of time with a ball mill, drying the mixture, and pulverizing the mixture in a dry state.

Furthermore, SnO$_2$ power is prepared in addition to the powders of Dy$_2$O$_3$, MgO, MnO, and SiO$_2$ as the accessory ingredients. The powders are then weighed as follows: Dy$_2$O$_3$ is about 0.75 mol parts, MgO is about 1 mol part, MnO is about 0.2 mol parts, and SiO$_2$ is about 1 mol part with respect to 100 mol parts of BaTiO$_3$ as the main ingredient, and regarding SnO$_2$, a ratio of SnO$_2$/BaTiO$_3$ is preferably not less than about 0.06 wt % and not more than about 1.25 wt %, for example. Raw material powder 2 is obtained by blending the powders with the BaTiO$_3$ powder as the main ingredient, mixing them for a certain amount of time with a ball mill, drying the mixture, and pulverizing the mixture in a dry state.

Next, ceramic slurry is prepared by adding a polyvinylbutyral-based binder and an organic solvent, such as ethanol, to the raw material powder 1, and mixing them in a wet state with a ball mill. A ceramic green sheet 1 not including SnO$_2$ and having a thickness of about 2.8 μm, for example, is obtained by shaping the ceramic slurry into a sheet with the doctor blade method.

Furthermore, slurry used to form the W gap is prepared by adding a polyvinylbutyral-based binder and an organic solvent, such as ethanol, to the raw material powder 2, and mixing them in a wet state with a ball mill.

Next, an inner-electrode conductive paste, which is used to form the inner electrode 22, is prepared. The inner-electrode conductive paste is obtained by preparing Ni powder as conductive powder, adding a polyvinylbutyral-based binder and an organic solvent, such as ethanol, to the Ni powder, and mixing them in a wet state with a ball mill.

Subsequently, the prepared inner-electrode conductive paste is applied to a surface of the ceramic green sheet 1, such that an inner electrode pattern is formed. The inner-electrode conductive paste may be applied by any of the known methods such as screen printing and gravure printing, for example.

Next, a predetermined number (e.g., 50) of the ceramic green sheets 1, each not including the inner electrode pattern formed thereon, are stacked. On a stack of the ceramic green sheets 1, a predetermined number (e.g., 301) of the ceramic green sheets 1, each including the inner electrode pattern formed thereon, are stacked such that the regions where the inner electrode patterns extend outward are arranged to be alternately positioned on the opposite sides. On a stack of those ceramic green sheets 1, a predetermined number (e.g., 50) of the ceramic green sheets 1, each not including the inner electrode pattern formed thereon, are further stacked. A multilayer body block is thus fabricated. The multilayer body block may be subjected, when needed, to pressure bonding in the lamination direction with an appropriate apparatus, such as an isostatic press, for example.

Thereafter, the multilayer body block is cut into a predetermined shape with predetermined sizes, and a multilayer body chip in a not-yet-fired state is obtained by the cutting. When cutting the multilayer body block to obtain the multilayer body chip, a cut position is adjusted such that the W gaps are not formed (namely, such that the inner electrode patterns are exposed at both the lateral surfaces, opposing to each other in the width direction y, of the multilayer body chip). At that time, corners and ridges of the multilayer body may be rounded by barrel polishing, for example.

Next, the W gaps are formed on the multilayer body chip obtained as described above. More specifically, the multilayer body chips after the cutting are arrayed in a matrix pattern with one lateral surface (LT surface) of each of the multilayer body chips directed upward, and an assembly of the arrayed multilayer body chips is fitted into a frame. At this time, a surface of the assembly is positioned at a level lower than a surface of the frame by a distance corresponding to the desired thickness (e.g., about 130 μm, which becomes about 100 μm after the firing) of the W gap to be formed. One of the W gaps is then formed on the one lateral surface of the multilayer body chip by coating the slurry for the W gap over the one lateral surface with a squeegee, and by drying the coated slurry. Thereafter, the other W gap is formed on the other lateral surface (LT surface) of the multilayer body chip in a similar manner. The slurry for the W gap preferably has high viscosity to avoid the slurry from dripping off from the lateral surface of the multilayer body chip.

Subsequently, the multilayer body chip including the W gaps and being in the not-yet-fired state is heated to about 350° C. in a N$_2$ atmosphere, for example, to burn out the binder. Thereafter, the multilayer body chip is heated at a rate of about 20° C./min and fired at about 1200° C. for about 20 minutes in a reducing atmosphere of H$_2$—N$_2$—H$_2$O gas in which an oxygen partial pressure is not lower than about $10^{-10}$ MPa and not higher than about $10^{-12}$ MPa, for example.

Next, an outer-electrode conductive paste is coated over both of the end surfaces of the multilayer body 12 after the firing and then baked. Thus, the first underlying electrode layer 32a of the first outer electrode 30a electrically connected to the first inner electrodes 22a and the second underlying electrode layer 32b of the second outer electrode 30b electrically connected to the second inner electrodes 22b are formed. The conductive paste for the outer electrode is, for example, a Cu paste including B$_2$O$_3$—SiO$_2$—BaO based glass frit. The baking is performed at about 600° C. in a N$_2$ atmosphere, for example.

Subsequently, when needed, the first plating layer 34a is formed to cover the first underlying electrode layer 32a, and the second plating layer 34b is formed to cover the second underlying electrode layer 32b.

When the first plating layer 34a and the second plating layer 34b are formed as Ni plating layers, an electrolytic plating method is preferably used to form those layers, for example.

When the first plating layer 34a and the second plating layer 34b are each formed in a two-layer structure, a Sn plating layer is formed, as required, on a surface of a Ni plating layer.

The multilayer ceramic capacitor 10 according to the second preferred embodiment is manufactured as described above.

Third Preferred Embodiment

A multilayer ceramic capacitor according to a third preferred embodiment of the present invention will be described below. The multilayer ceramic capacitor 10 according to the third preferred embodiment has a similar structure to that of the multilayer ceramic capacitor 10 according to the first preferred embodiment, described above with reference to FIGS. 1 to 3, except for the presence of Sn in the inner electrode 22. Therefore, description is omitted regarding the same structure as that of the multilayer ceramic capacitor 10 according to the first preferred embodiment.

In the multilayer ceramic capacitor 10 according to the third preferred embodiment, Sn is dissolved in a solid state in Ni of the inner electrode 22 (i.e., the first inner electrode 22a or the second inner electrode 22b) positioned in the inner layer section 16 and contacting the first principal surface-side outer layer section 18a. Assuming a total of Ni and Sn in the inner electrode 22 contacting the first principal surface-side outer layer section 18a to be 100 mol, the Sn content is preferably not less than about 0.1 mol and not more than about 8.5 mol. More preferably, the Sn content is not less than about 1.0 mol and not more than about 8.5 mol, for example, where the total of Ni and Sn in the inner electrode 22 contacting the first principal surface-side outer layer section 18a is 100 mol.

Furthermore, Sn is dissolved in a solid state in Ni of the inner electrode 22 (i.e., the first inner electrode 22a or the second inner electrode 22b) positioned in the inner layer section 16 and contacting the second principal surface-side outer layer section 18b. When a total of Ni and Sn in the inner electrode 22 contacting the second principal surface-side outer layer section 18b to be 100 mol, the Sn content is preferably not less than about 0.1 mol and not more than about 8.5 mol. More preferably, the Sn content is not less than about 1.0 mol and not more than about 8.5 mol, for example, where the total of Ni and Sn in the inner electrode 22 contacting the second principal surface-side outer layer section 18b is 100 mol.

Moreover, in the multilayer ceramic capacitor 10 according to the third preferred embodiment, Sn is dissolved in a solid state in Ni of the inner electrode 22 (i.e., each of the first inner electrode 22a and the second inner electrode 22b) positioned in the inner layer section 16 within the region S1 extending about 5 μm along the width direction y from the outermost surface 16c of the inner layer section 16 on the side closer to the first lateral surface 12c. Assuming that a total of Ni and Sn in the inner electrode 22 within the region S1 extending about 5 μm along the width direction y from the outermost surface 16c of the inner layer section 16 on the side closer to the first lateral surface 12c is 100 mol, the Sn content is preferably not less than about 0.1 mol and not more than about 8.5 mol. More preferably, the Sn content is not less than about 1.0 mol and not more than about 8.5 mol, for example, where the total of Ni and Sn in the inner electrode 22 within the region S1 extending about 5 μm along the width direction y from the outermost surface 16c of the inner layer section 16 on the side closer to the first lateral surface 12c is 100 mol.

In addition, Sn is dissolved in a solid state in Ni of the inner electrode 22 (i.e., each of the first inner electrode 22a and the second inner electrode 22b) positioned in the inner layer section 16 within the region S2 extending about 5 μm along the width direction y from the outermost surface 16d of the inner layer section 16 on the side closer to the second lateral surface 12d. Assuming that a total of Ni and Sn in the inner electrode 22 within the region S2 extending about 5 μm along the width direction y from the outermost surface 16d of the inner layer section 16 on the side closer to the second lateral surface 12d is 100 mol, the Sn content is preferably not less than about 0.1 mol and not more than about 8.5 mol. More preferably, the Sn content is not less than about 1.0 mol and not more than about 8.5 mol, for example, where the total of Ni and Sn in the inner electrode 22 within the region S2 extending about 5 μm along the width direction y from the outermost surface 16d of the inner layer section 16 on the side closer to the second lateral surface 12d is 100 mol.

Thus, the multilayer ceramic capacitor 10 according to the third preferred embodiment includes the following features. Sn is dissolved in a solid state in Ni of the inner electrode 22 positioned in the inner layer section 16 and contacting the first principal surface-side outer layer section 18a, and the Sn content is preferably not less than about 0.1 mol and not more than about 8.5 mol, for example, where the total of Ni and Sn in the inner electrode 22 contacting the first principal surface-side outer layer section 18a is 100 mol. Furthermore, Sn is dissolved in a solid state in Ni of the inner electrode 22 positioned in the inner layer section 16 and contacting the second principal surface-side outer layer section 18b, and the Sn content is preferably not less than about 0.1 mol and not more than about 8.5 mol, for example, where the total of Ni and Sn in the inner electrode 22 contacting the second principal surface-side outer layer section 18b is 100 mol.

Moreover, Sn is dissolved in a solid state in Ni of the inner electrode 22 positioned in the inner layer section 16 within the region S1 extending about 5 μm along the width direction y from the outermost surface 16c of the inner layer section 16 on the side closer to the first lateral surface 12c, and the Sn content is preferably not less than about 0.1 mol and not more than about 8.5 mol, for example, where the total of Ni and Sn in the inner electrode 22 within the region S1 extending about 5 μm along the width direction y from the outermost surface 16c of the inner layer section 16 on the side closer to the first lateral surface 12c is 100 mol. Furthermore, Sn is dissolved in a solid state in Ni of the inner electrode 22 positioned in the inner layer section 16 within the region S2 extending about 5 μm along the width direction y from the outermost surface 16d of the inner layer section 16 on the side closer to the second lateral surface 12d, and the Sn content is preferably not less than about 0.1 mol and not more than about 8.5 mol, for example, where the total of Ni and Sn in the inner electrode 22 within the region S2 extending about 5 μm along the width direction y from the outermost surface 16d of the inner layer section 16 on the side closer to the second lateral surface 12d is 100 mol.

With these features, not only the inner electrodes 22 contacting the first principal surface-side outer layer section 18a and the second principal surface-side outer layer section 18b, but also the inner electrodes 22 within the regions extending about 5 μm along the width direction y from the outermost surfaces of the inner layer section 16 on the sides closer to the first lateral surface 12c and the second lateral surface 12d are changed to Ni—Sn alloys. Therefore, a state (height of an electrical barrier) at the ceramic-electrode interface is able to be changed, and a longer high temperature load life is achieved. The reason is presumably that, because failures in a high temperature loading test of the multilayer ceramic capacitor occur at the end portions of the inner electrodes 22 in the effective layer (inner layer section) in many cases, the high temperature load life in the entirety of the multilayer ceramic capacitor is able to be prolonged by prolonging the high temperature load life in those end portions.

In addition, the multilayer ceramic capacitor 10 according to the third preferred embodiment preferably includes the following features. The Sn content is not less than about 1.0 mol and not more than about 8.5 mol where the total of Ni and Sn in the inner electrode 22 contacting the first principal surface-side outer layer section 18a is 100 mol, and the Sn content is not less than about 1.0 mol and not more than about 8.5 mol where the total of Ni and Sn in the inner electrode 22 contacting the second principal surface-side outer layer section 18b is 100 mol. Moreover, the Sn content is not less than about 1.0 mol and not more than about 8.5 mol where the total of Ni and Sn in the inner electrode 22 within the region S1 extending about 5 μm along the width direction y from the outermost surface 16c of the inner layer section 16 on the side closer to the first lateral surface 12c is 100 mol, and the Sn content is not less than about 1.0 mol and not more than about 8.5 mol where the total of Ni and Sn in the inner electrode 22 within the region S2 extending about 5 μm along the width direction y from the outermost surface 16d of the inner layer section 16 on the side closer to the second lateral surface 12d is 100 mol.

With these features, the following advantageous effect is obtained in addition to the above-described advantageous effect. A portion of Ni is able to be replaced with Sn and changed to a Ni—Sn alloy, and physical properties (e.g., coefficient of linear expansion) in that portion are able to be changed. Therefore, the coefficient of linear expansion is made different between the central region of the effective layer (inner layer section) and the region of the effective layer (inner layer section) near the ineffective layer (outer layer section), such that the stress distribution inside the multilayer ceramic capacitor 10 is able to be changed and the electrostatic capacitance is increased. As a result, it is possible to achieve a longer high temperature load life and a larger electrostatic capacitance at the same time.

One non-limiting example of a manufacturing method for the above-described multilayer ceramic capacitor according to the third preferred embodiment will be described below.

First, $BaTiO_3$ powder as a main ingredient is prepared. More specifically, the $BaTiO_3$ powder as the main ingredient is obtained by weighing $BaCO_3$ powder and $TiO_2$ powder in predetermined amounts, mixing the powders for a certain time with a ball mill, and then performing heat treatment on the mixture.

The dielectric material powder used for the dielectric layers 14 preferably includes, as the main ingredient, a perovskite oxide including Ba and Ti, for example.

Next, powders of $Dy_2O_3$, MgO, MnO, and $SiO_2$ as accessory ingredients are prepared. These powders are then weighed as follows: $Dy_2O_3$ is about 0.75 mol parts, MgO is about 1 mol part, MnO is about 0.2 mol parts, and $SiO_2$ is about 1 mol part with respect to 100 mol parts of $BaTiO_3$ as the main ingredient. Raw material powder 1 is obtained by blending those powders with the $BaTiO_3$ powder as the main ingredient, mixing them for a certain time with a ball mill, drying the mixture, and pulverizing the mixture in a dry state.

Furthermore, $SnO_2$ power is prepared in addition to the powders of $Dy_2O_3$, MgO, MnO, and $SiO_2$ as the accessory ingredients. These powders are then weighed as follows: $Dy_2O_3$ is about 0.75 mol parts, MgO is about 1 mol part, MnO is about 0.2 mol parts, and $SiO_2$ is about 1 mol part with respect to 100 mol parts of $BaTiO_3$ as the main ingredient, and regarding $SnO_2$, a ratio of $SnO_2/BaTiO_3$ is preferably not less than about 0.06 wt % and not more than about 1.25 wt %, for example. Raw material powder 2 is obtained by blending those powders with the $BaTiO_3$ powder as the main ingredient, mixing them for a certain time with a ball mill, drying the mixture, and pulverizing the mixture in a dry state.

Next, ceramic slurry is prepared by adding a polyvinylbutyral-based binder and an organic solvent, such as ethanol, to the raw material powder 1, and mixing them in a wet state with a ball mill. A ceramic green sheet 1 not including $SnO_2$ and having a thickness of about 2.8 μm, for example, is obtained by shaping the ceramic slurry into a sheet with the doctor blade method.

Similarly, ceramic slurry is prepared by adding a polyvinylbutyral-based binder and an organic solvent, such as ethanol, to the raw material powder 2, and mixing them in a wet state with a ball mill. A ceramic green sheet 2 containing $SnO_2$ and having a thickness of about 2.8 μm, for example, is obtained by shaping the ceramic slurry into a sheet with the doctor blade method.

Furthermore, slurry is prepared by adding a polyvinylbutyral-based binder and an organic solvent, such as ethanol, to the raw material powder 2, and mixing them in a wet state with a ball mill. Thus, slurry used to form the W gap is obtained.

Next, an inner-electrode conductive paste, which is used to form the inner electrode 22, is prepared. The inner-electrode conductive paste is obtained by preparing Ni powder as conductive powder, adding a polyvinylbutyral-based binder and an organic solvent, such as ethanol, to the Ni powder, and mixing them in a wet state with a ball mill.

Subsequently, the prepared inner-electrode conductive paste is applied to a surface of the ceramic green sheet 1, such that an inner electrode pattern is formed. The inner-electrode conductive paste may be applied by any of the known methods such as screen printing and gravure printing, for example.

Next, a predetermined number (e.g., 50) of the ceramic green sheets 2 alone, each not including the inner electrode pattern formed thereon, are stacked. On a stack of the ceramic green sheets 2, a predetermined number (e.g., 301) of the ceramic green sheets 1, each including the inner electrode pattern formed thereon, are stacked such that the regions where the inner electrode patterns extend outward are arranged to be alternately positioned on the opposite sides. On a stack of those ceramic green sheets 1 and 2, a predetermined number (e.g., 50) of the ceramic green sheets 2 alone, each not including the inner electrode pattern formed thereon, are further stacked. A multilayer body block is thus fabricated. The multilayer body block may be subjected, when needed, to pressure bonding in the lamination direction with an appropriate apparatus, such as an isostatic press, for example.

Thereafter, the multilayer body block is cut into a predetermined shape with predetermined sizes, and a multilayer body chip in a not-yet-fired state is obtained by the cutting. When cutting the multilayer body block to obtain the multilayer body chip, a cut position is adjusted such that the W gaps are not formed (namely, such that the inner electrode pattern is exposed at both the lateral surfaces, opposing to each other in the width direction y, of the multilayer body chip). At this time, corners and ridges of the multilayer body may be rounded by barrel polishing, for example.

Next, the W gaps are formed on the multilayer body chip obtained as described above. More specifically, the multilayer body chips after the cutting are arrayed in a matrix pattern with one lateral surface (LT surface) of each of the multilayer body chips directed upward, and an assembly of the arrayed multilayer body chips is fitted into a frame. At that time, a surface of the assembly is positioned at a level lower than a surface of the frame by a distance corresponding to the desired thickness (e.g., about 130 μm, which becomes about 100 μm after the firing) of the W gap to be formed. One of the W gaps is then formed on the one lateral surface of the multilayer body chip by coating the slurry for the W gap over the one lateral surface with a squeegee, and by drying the coated slurry. Thereafter, the other W gap is formed on the other lateral surface (LT surface) of the multilayer body chip in a similar manner. The slurry for the W gap preferably has high viscosity to avoid the slurry from dripping off from the lateral surface of the multilayer body chip.

Subsequently, the multilayer body chip including the W gaps and being in the not-yet-fired state is heated to about 350° C. in a $N_2$ atmosphere, for example, to burn out the binder. Thereafter, the multilayer body chip is heated at a rate of about 20° C./min and fired at about 1200° C. for about 20 minutes in a reducing atmosphere of $H_2$—$N_2$—$H_2O$ gas in which an oxygen partial pressure is not lower than about $10^{-10}$ MPa and not higher than about $10^{-12}$ MPa, for example.

Next, a conductive paste for the outer electrode is coated over both of the end surfaces of the multilayer body 12 after the firing and then baked. Thus, the first underlying electrode layer 32a of the first outer electrode 30a electrically connected to the first inner electrodes 22a, and the second underlying electrode layer 32b of the second outer electrode 30b electrically connected to the second inner electrodes 22b are formed. The conductive paste for the outer electrode is, for example, a Cu paste including $B_2O_3$—$SiO_2$—BaO based glass frit. The baking is performed at about 600° C. in a $N_2$ atmosphere, for example.

Subsequently, when needed, the first plating layer 34a is formed to cover the first underlying electrode layer 32a, and the second plating layer 34b is formed to cover the second underlying electrode layer 32b.

When the first plating layer 34a and the second plating layer 34b are formed as Ni plating layers, an electrolytic plating method is preferably used to form those layers, for example.

When the first plating layer 34a and the second plating layer 34b are each formed in a two-layer structure, a Sn plating layer is formed, as required, on a surface of a Ni plating layer.

The multilayer ceramic capacitor 10 according to the third preferred embodiment is manufactured as described above.

In order to confirm the advantageous effect of the multilayer ceramic capacitors 10 according to the above-described first through third preferred embodiments, the dielectric constants of the multilayer ceramic capacitors were determined, and experiments based on the high temperature loading test were carried out.

By using the manufacturing methods described above, multilayer ceramic capacitors were fabricated as samples (Sample Nos. 1 to 21) of experimental examples in accordance with the following conditions.

Sizes (design values) of each multilayer ceramic capacitor were set to (length×width×height=about 2.0 mm×about 1.2 mm×about 1.2 mm), and a thickness of each dielectric layer interposed between adjacent two of the inner electrodes was about 2.2 μm. A total number of the dielectric layers in the inner layer section was 300, and an area of the opposing electrodes per layer was about $1.6 \times 10^{-6}$ m². A thickness of each of the first principal surface-side outer layer section and the second principal surface-side outer layer section in the lamination direction x and a thickness of each of the first lateral surface-side outer layer section and the second lateral surface-side outer layer section in the width direction y were each about 100 μm.

Regarding Sample Nos. 1 to 4, Sample Nos. 11 to 13, and Sample No. 20, the samples of the multilayer ceramic capacitors were fabricated in accordance with the manufacturing method of the multilayer ceramic capacitor according to the first preferred embodiment.

In preparation of the raw material powder 2, Sample No. 1 did not include $SnO_2$.

On the other hand, in preparation of the raw material powder 2, the ratio of $SnO_2/BaTiO_3$ in Sample No. 2 was set to about 0.01 wt %, the ratio of $SnO_2/BaTiO_3$ in Sample No. 3 was set to about 0.06 wt %, the ratio of $SnO_2/BaTiO_3$ in Sample No. 4 was set to about 0.10 wt %, the ratio of $SnO_2/BaTiO_3$ in Sample No. 11 was set to about 0.18 wt %, the ratio of $SnO_2/BaTiO_3$ in Sample No. 12 was set to about 0.75 wt %, the ratio of $SnO_2/BaTiO_3$ in Sample No. 13 was set to about 1.25 wt %, and the ratio of $SnO_2/BaTiO_3$ in Sample No. 20 was set to about 1.50 wt %.

In the inner electrodes of Sample No. 1, Sn was not dissolved in a solid state in Ni of the inner electrodes.

In the multilayer ceramic capacitors of the samples of Sample Nos. 2 to 4, Sample Nos. 11 to 13, and Sample No. 20, Sn was dissolved in a solid state in Ni of only the inner electrodes positioned in the inner layer section and contacting the first principal surface-side outer layer section and the second principal surface-side outer layer section.

Regarding Sample Nos. 5 to 7, Sample Nos. 14 to 16, and Sample No. 21, the samples of the multilayer ceramic capacitors were fabricated in accordance with the manufacturing method of the multilayer ceramic capacitor according to the second preferred embodiment.

In preparation of the raw material powder 2, the ratio of $SnO_2/BaTiO_3$ in Sample No. 5 was set to about 0.01 wt %, the ratio of $SnO_2/BaTiO_3$ in Sample No. 6 was set to about 0.06 wt %, the ratio of $SnO_2/BaTiO_3$ in Sample No. 7 was set to about 0.10 wt %, the ratio of $SnO_2/BaTiO_3$ in Sample No. 14 was set to about 0.18 wt %, the ratio of $SnO_2/BaTiO_3$ in Sample No. 15 was set to about 0.75 wt %, the ratio of $SnO_2/BaTiO_3$ in Sample No. 16 was set to about 1.25 wt %, and the ratio of $SnO_2/BaTiO_3$ in Sample No. 21 was set to about 1.50 wt %.

In the multilayer ceramic capacitors of the samples of Sample Nos. 5 to 7, Sample Nos. 14 to 16, and Sample No. 21, Sn was dissolved in a solid state in Ni of only the inner electrodes positioned in the inner layer section within the regions extending about 5 μm along the width direction from the outermost surfaces of the inner layer section on the sides closer to the first lateral surface and the second lateral surface.

Regarding Sample Nos. 8 to 10 and Sample Nos. 17 to 19, the samples of the multilayer ceramic capacitors were fabricated in accordance with the manufacturing method of the multilayer ceramic capacitor according to the third preferred embodiment.

In preparation of the raw material powder 2, the ratio of $SnO_2/BaTiO_3$ in Sample No. 8 was set to about 0.01 wt %, the ratio of $SnO_2/BaTiO_3$ in Sample No. 9 was set to about 0.06 wt %, the ratio of $SnO_2/BaTiO_3$ in Sample No. 10 was set to about 0.10 wt %, and the ratio of $SnO_2/BaTiO_3$ in Sample No. 17 was set to about 0.18 wt %, the ratio of $SnO_2/BaTiO_3$ in Sample No. 18 was set to about 0.75 wt %, and the ratio of $SnO_2/BaTiO_3$ in Sample No. 19 was set to about 1.25 wt %.

In the multilayer ceramic capacitors of the samples of Sample Nos. 8 to 10 and Sample Nos. 17 to 19, Sn was dissolved in a solid state in Ni of not only the inner electrodes positioned in the inner layer section and contacting the first principal surface-side outer layer section and the second principal surface-side outer layer section, but also the inner electrodes positioned in the inner layer section within the regions extending about 5 μm along the width direction from the outermost surfaces of the inner layer section on the sides closer to the first lateral surface and the second lateral surface.

Each sample was set to stand vertically, and a resin was applied to the surroundings of the sample to fixedly hold it. Then, the WT surface of each sample was exposed. Subsequently, the WT surface was polished with a polishing machine. The polishing was terminated at a position in which the polishing reached a depth corresponding to about ½ of the length of the multilayer ceramic capacitor in the length direction z, thus making the WT surface exposed at that position. After the polishing, the polished surface was processed by ion milling to eliminate droops of the inner electrode caused by the polishing.

With respect to a zone of the WT surface at which the inner electrodes of the sample were laminated, as illustrated in FIG. 3, at the position corresponding to about ½ of the length of the multilayer ceramic capacitor in the length direction z, the inner electrodes to be analyzed were selected respectively from the inner electrodes contacting the first principal surface-side outer layer section and the second principal surface-side outer layer section, from the inner electrodes within the regions extending about 5 μm along the width direction from the outermost surfaces of the inner layer section on the sides closer to the first lateral surface and the second lateral surface, and from the inner electrodes within regions (called "central regions" hereafter), which were positioned in middle one of three zones resulting from dividing the laminated zone of the inner electrodes into three equal or substantially equal portions in the lamination direction x, and which extended about 5 μm along the width direction from the outermost surfaces of the inner layer section on the sides closer to the first lateral surface and the second lateral surface. A quantitative analysis of Ni and Sn was performed on 10 points of each inner electrode using FE-WDX (scanning electron microscope). JXA-8500F (made by JEOL (Japan Electron Optics Laboratory) Ltd.) was used as the FE-WDX, and a measurement was performed under conditions of an accelerating voltage of about 15 kV and an irradiation current of about 50 nA.

Each sample was evaluated with respect to the dielectric constant and the high temperature loading test.

The high temperature loading test was conducted by measuring deterioration of an insulation resistance.

Determination of the dielectric constant and the high temperature loading test were performed on each of the samples of Sample Nos. 1 to 21 as follows.

First, ten samplings were taken from each of Sample Nos. 1 to 21. Then, the dielectric constant was determined by measuring an electrostatic capacitance (C) and a dielectric loss under application of an AC voltage of about 1 Vrms at about 1 kHz with an automatic bridge meter. Thereafter, the high temperature loading test was conducted at about 165° C. and about 7.5 V, and a time lapsed until the insulation resistance was reduced to about 10 kΩ or below was determined as a time-to-failure. A mean time-to-failure (MTTF) was calculated from values of the determined time-to-failure.

Table 1 lists the results of the dielectric constant and the mean time-to-failure (MTTF) of the multilayer ceramic capacitor for each Sample No. It is to be noted that Sample Nos. denoted by a mark in Table 1 do not fall within the scope of the present invention.

TABLE 1

| Sample No. | Solid Solution of Sn in Inner Electrodes Contacting First and Second Principal Surface-Side Outer Layer Sections | | Solid Solution of Sn in Inner Electrodes within Regions Extending 5 μm along Width Direction from Outermost Surfaces of Inner Layer Section on Sides Closer to First and Second Lateral Surfaces | | MTTF (Mean Time-To-Failure) (hr) | Electrostatic Capacitance (μF) |
|---|---|---|---|---|---|---|
| | Ratio of $SnO_2/BaTiO_3$ (wt %) | Sn Content on Assumption of Total of Ni and Sn being 100 mol (mol) | Ratio of $SnO_2/BaTiO_3$ (wt %) | Sn Content on Assumption of Total of Ni and Sn being 100 mol (mol) | | |
| *1 | $SnO_2$ not added | 0.00 | $SnO_2$ not added | 0.00 | 27 | 5.11 |
| *2 | 0.01 | 0.06 | $SnO_2$ not added | 0.00 | 31 | 5.10 |
| 3 | 0.06 | 0.10 | $SnO_2$ not added | 0.00 | 80 | 5.08 |
| 4 | 0.10 | 0.50 | $SnO_2$ not added | 0.00 | 83 | 5.07 |
| *5 | $SnO_2$ not added | 0.00 | 0.01 | 0.06 | 28 | 5.09 |
| 6 | $SnO_2$ not added | 0.00 | 0.06 | 0.10 | 82 | 5.12 |
| 7 | $SnO_2$ not added | 0.00 | 0.10 | 0.50 | 86 | 5.13 |
| 8 | 0.01 | 0.06 | 0.01 | 0.06 | 30 | 5.11 |
| 9 | 0.06 | 0.10 | 0.06 | 0.10 | 85 | 5.13 |
| 10 | 0.10 | 0.50 | 0.10 | 0.50 | 88 | 5.15 |
| 11 | 0.18 | 1.00 | $SnO_2$ not added | 0.00 | 92 | 5.48 |
| 12 | 0.75 | 4.00 | $SnO_2$ not added | 0.00 | 93 | 5.46 |
| 13 | 1.25 | 8.50 | $SnO_2$ not added | 0.00 | 89 | 5.48 |
| 14 | $SnO_2$ not added | 0.00 | 0.18 | 1.00 | 90 | 5.45 |
| 15 | $SnO_2$ not added | 0.00 | 0.75 | 4.00 | 91 | 5.50 |
| 16 | $SnO_2$ not added | 0.00 | 1.25 | 8.50 | 87 | 5.44 |
| 17 | 0.18 | 1.00 | 0.18 | 1.00 | 94 | 5.59 |
| 18 | 0.75 | 4.00 | 0.75 | 4.00 | 90 | 5.44 |
| 19 | 1.25 | 8.50 | 1.25 | 8.50 | 96 | 5.53 |
| *20 | 1.50 | 10.20 | $SnO_2$ not added | 0.00 | 20 | 5.41 |
| *21 | $SnO_2$ not added | 0.00 | 1.50 | 10.20 | 20 | 5.42 |

*Does not fall within the scope of the invention.

The experimental results of the multilayer ceramic capacitors according to the first preferred embodiment are first described with reference to Table 1.

In Sample No. 3, Sn was dissolved in a solid state in Ni of only the inner electrodes contacting the first principal surface-side outer layer section and the second principal surface-side outer layer section, and the Sn content was about 0.10 mol where the total of Ni and Sn in each of the inner electrode was 100 mol. Under these conditions, the MTTF was about 80 hours and the electrostatic capacitance was about 5.08 μF.

In Sample No. 4, Sn was dissolved in a solid state in Ni of only the inner electrodes contacting the first principal surface-side outer layer section and the second principal surface-side outer layer section, and the Sn content was about 0.50 mol where the total of Ni and Sn in each of the inner electrodes was 100 mol. Under those conditions, the MTTF was about 83 hours and the electrostatic capacitance was about 5.07 μF.

In Sample No. 11, Sn was dissolved in a solid state in Ni of only the inner electrodes contacting the first principal surface-side outer layer section and the second principal surface-side outer layer section, and the Sn content was about 1.00 mol where the total of Ni and Sn in each of the inner electrodes was 100 mol. Under those conditions, the MTTF was about 92 hours and the electrostatic capacitance was about 5.48 µF.

In Sample No. 12, Sn was dissolved in a solid state in Ni of only the inner electrodes contacting the first principal surface-side outer layer section and the second principal surface-side outer layer section, and the Sn content was about 4.00 mol where the total of Ni and Sn in each of the inner electrodes was 100 mol. Under those conditions, the MTTF was about 93 hours and the electrostatic capacitance was about 5.46 µF.

In Sample No. 13, Sn was dissolved in a solid state in Ni of only the inner electrodes contacting the first principal surface-side outer layer section and the second principal surface-side outer layer section, and the Sn content was about 8.50 mol where the total of Ni and Sn in each of the inner electrodes was 100 mol. Under those conditions, the MTTF was about 89 hours and the electrostatic capacitance was about 5.48 µF.

On the other hand, in Sample No. 1, Sn was not dissolved in a solid state in Ni of the inner electrodes. Under that condition, the MTTF was about 27 hours and the electrostatic capacitance was about 5.11 µF.

In Sample No. 2, Sn was dissolved in a solid state in Ni of only the inner electrodes contacting the first principal surface-side outer layer section and the second principal surface-side outer layer section, but the Sn content was about 0.06 mol where the total of Ni and Sn in each of the inner electrodes was 100 mol. Under those conditions, the MTTF was about 31 hours and the electrostatic capacitance was about 5.10 µF.

In Sample No. 20, Sn was dissolved in a solid state in Ni of only the inner electrodes contacting the first principal surface-side outer layer section and the second principal surface-side outer layer section, but the Sn content was about 10.20 mol where the total of Ni and Sn in each of the inner electrodes was 100 mol. Under those conditions, the MTTF was about 20 hours and the electrostatic capacitance was about 5.41 µF.

As seen from the above-described results, in the case, such as Sample No. 3, Sample No. 4, and Sample Nos. 11 to 13, where Sn was dissolved in a solid state in Ni of only the inner electrodes contacting the first principal surface-side outer layer section and the second principal surface-side outer layer section, and where the Sn content was not less than about 0.1 mol and not more than about 8.5 mol where the total of Ni and Sn in each of the inner electrodes was 100 mol, the MTTF was longer than that in any of Sample Nos. 1, 2 and 20, and a satisfactory result was obtained.

Furthermore, in the case, such as Sample Nos. 11 to 13, where Sn was dissolved in a solid state in Ni of only the inner electrodes contacting the first principal surface-side outer layer section and the second principal surface-side outer layer section, and where the Sn content was not less than about 1.0 mol and not more than about 8.5 mol where the total of Ni and Sn in each of the inner electrodes was 100 mol, an increase of the electrostatic capacitance was proved from a comparison of the electrostatic capacitances in the samples of Sample Nos. 11 to 13 with the electrostatic capacitances in the samples of Sample Nos. 3 and 4.

The experimental results of the multilayer ceramic capacitors according to the second preferred embodiment are described below with reference to Table 1.

In Sample No. 6, Sn was dissolved in a solid state in Ni of only the inner electrodes within the regions extending about 5 µm along the width direction from the outermost surfaces of the inner layer section on the sides closer to the first lateral surface and the second lateral surface, and the Sn content was about 0.10 mol where the total of Ni and Sn in each of the inner electrodes was 100 mol. Under those conditions, the MTTF was about 82 hours and the electrostatic capacitance was about 5.12 µF.

In Sample No. 7, Sn was dissolved in a solid state in Ni of only the inner electrodes within the regions extending about 5 µm along the width direction from the outermost surfaces of the inner layer section on the sides closer to the first lateral surface and the second lateral surface, and the Sn content was about 0.50 mol where the total of Ni and Sn in each of the inner electrodes was 100 mol. Under those conditions, the MTTF was about 86 hours and the electrostatic capacitance was about 5.13 µF.

In Sample No. 14, Sn was dissolved in a solid state in Ni of only the inner electrodes within the regions extending about 5 µm along the width direction from the outermost surfaces of the inner layer section on the sides closer to the first lateral surface and the second lateral surface, and the Sn content was about 1.00 mol where the total of Ni and Sn in each of the inner electrodes was 100 mol. Under those conditions, the MTTF was about 90 hours and the electrostatic capacitance was about 5.45 µF.

In Sample No. 15, Sn was dissolved in a solid state in Ni of only the inner electrodes within the regions extending about 5 µm along the width direction from the outermost surfaces of the inner layer section on the sides closer to the first lateral surface and the second lateral surface, and the Sn content was about 4.00 mol where the total of Ni and Sn in each of the inner electrodes was 100 mol. Under those conditions, the MTTF was about 91 hours and the electrostatic capacitance was about 5.50 µF.

In Sample No. 16, Sn was dissolved in a solid state in Ni of only the inner electrodes within the regions extending about 5 µm along the width direction from the outermost surfaces of the inner layer section on the sides closer to the first lateral surface and the second lateral surface, and the Sn content was about 8.50 mol where the total of Ni and Sn in each of the inner electrodes was 100 mol. Under those conditions, the MTTF was about 87 hours and the electrostatic capacitance was about 5.44 µF.

On the other hand, in Sample No. 5, Sn was dissolved in a solid state in Ni of only the inner electrodes within the regions extending about 5 µm along the width direction from the outermost surfaces of the inner layer section on the sides closer to the first lateral surface and the second lateral surface, but the Sn content was about 0.06 mol where the total of Ni and Sn in each of the inner electrodes was 100 mol. Under those conditions, the MTTF was about 28 hours and the electrostatic capacitance was about 5.09 µF.

In Sample No. 21, Sn was dissolved in a solid state in Ni of only the inner electrodes within the regions extending about 5 µm along the width direction from the outermost surfaces of the inner layer section on the sides closer to the first lateral surface and the second lateral surface, but the Sn content was about 10.20 mol where the total of Ni and Sn in each of the inner electrodes was 100 mol. Under those conditions, the MTTF was about 20 hours and the electrostatic capacitance was about 5.42 µF.

As seen from the above-described results, in the case, such as Sample No. 6, Sample No. 7, and Sample Nos. 14 to 16, where Sn was dissolved in a solid state in Ni of only the inner electrodes within the regions extending about 5 μm along the width direction from the outermost surfaces of the inner layer section on the sides closer to the first lateral surface and the second lateral surface, and where the Sn content was not less than about 0.1 mol and not more than about 8.5 mol where the total of Ni and Sn in each of the inner electrodes was 100 mol, the MTTF was longer than that in any samples of Sample Nos. 5 and 21, and a satisfactory result was obtained.

Furthermore, in the case, such as Sample Nos. 14 to 16, where Sn was dissolved in a solid state in Ni of only the inner electrodes within the regions extending about 5 μm along the width direction from the outermost surfaces of the inner layer section on the sides closer to the first lateral surface and the second lateral surface, and where the Sn content was not less than about 1.0 mol and not more than about 8.5 mol where the total of Ni and Sn in each of the inner electrodes was 100 mol, an increase of the electrostatic capacitance was proved from a comparison of the electrostatic capacitances in the samples of Sample Nos. 14 to 16 with the electrostatic capacitances in the samples of Sample Nos. 6 and 7.

The experimental results of the multilayer ceramic capacitors according to the third preferred embodiment are described below with reference to Table 1.

In Sample No. 9, Sn was dissolved in a solid state in Ni of not only the inner electrodes contacting the first principal surface-side outer layer section and the second principal surface-side outer layer section, but also the inner electrodes within the regions extending about 5 μm along the width direction from the outermost surfaces of the inner layer section on the sides closer to the first lateral surface and the second lateral surface, and the Sn content was about 0.10 mol where the total of Ni and Sn in each of those inner electrodes was 100 mol. Under those conditions, the MTTF was about 85 hours and the electrostatic capacitance was about 5.13 μF.

In Sample No. 10, Sn was dissolved in a solid state in Ni of not only the inner electrodes contacting the first principal surface-side outer layer section and the second principal surface-side outer layer section, but also the inner electrodes within the regions extending about 5 μm along the width direction from the outermost surfaces of the inner layer section on the sides closer to the first lateral surface and the second lateral surface, and the Sn content was about 0.50 mol where the total of Ni and Sn in each of those inner electrodes was 100 mol. Under those conditions, the MTTF was about 88 hours and the electrostatic capacitance was about 5.15 μF.

In Sample No. 17, Sn was dissolved in a solid state in Ni of not only the inner electrodes contacting the first principal surface-side outer layer section and the second principal surface-side outer layer section, but also the inner electrodes within the regions extending about 5 μm along the width direction from the outermost surfaces of the inner layer section on the sides closer to the first lateral surface and the second lateral surface, and the Sn content was about 1.00 mol where the total of Ni and Sn in each of those inner electrodes was 100 mol. Under those conditions, the MTTF was about 94 hours and the electrostatic capacitance was about 5.59 μF.

In Sample No. 18, Sn was dissolved in a solid state in Ni of not only the inner electrodes contacting the first principal surface-side outer layer section and the second principal surface-side outer layer section, but also the inner electrodes within the regions extending about 5 μm along the width direction from the outermost surfaces of the inner layer section on the sides closer to the first lateral surface and the second lateral surface, and the Sn content was about 4.00 mol where the total of Ni and Sn in each of those inner electrodes was 100 mol. Under those conditions, the MTTF was about 90 hours and the electrostatic capacitance was about 5.44 μF.

In Sample No. 19, Sn was dissolved in a solid state in Ni of not only the inner electrodes contacting the first principal surface-side outer layer section and the second principal surface-side outer layer section, but also the inner electrodes within the regions extending about 5 μm along the width direction from the outermost surfaces of the inner layer section on the sides closer to the first lateral surface and the second lateral surface, and the Sn content was about 8.50 mol where the total of Ni and Sn in each of those inner electrodes was 100 mol. Under those conditions, the MTTF was about 96 hours and the electrostatic capacitance was about 5.53 μF.

On the other hand, in Sample No. 8, Sn was dissolved in a solid state in Ni of not only the inner electrodes contacting the first principal surface-side outer layer section and the second principal surface-side outer layer section, but also the inner electrodes within the regions extending about 5 μm along the width direction from the outermost surfaces of the inner layer section on the sides closer to the first lateral surface and the second lateral surface, while the Sn content was about 0.06 mol where the total of Ni and Sn in each of those inner electrodes was 100 mol. Under those conditions, the MTTF was about 30 hours and the electrostatic capacitance was about 5.11 μF.

As seen from the above-described results, in the case, such as Sample No. 9, Sample No. 10, and Sample Nos. 17 to 19, where Sn was dissolved in a solid state in Ni of not only the inner electrodes contacting the first principal surface-side outer layer section and the second principal surface-side outer layer section, but also the inner electrodes within the regions extending about 5 μm along the width direction from the outermost surfaces of the inner layer section on the sides closer to the first lateral surface and the second lateral surface, and where the Sn content was not less than about 0.1 mol and not more than about 8.5 mol where the total of Ni and Sn in each of those inner electrodes was 100 mol, the MTTF was longer than that in Sample No. 8, and a satisfactory result was obtained.

Furthermore, in the case, such as Sample Nos. 17 to 19, where Sn was dissolved in a solid state in Ni of not only the inner electrodes contacting the first principal surface-side outer layer section and the second principal surface-side outer layer section, but also the inner electrodes within the regions extending about 5 μm along the width direction from the outermost surfaces of the inner layer section on the sides closer to the first lateral surface and the second lateral surface, and where the Sn content was not less than about 1.0 mol and not more than about 8.5 mol where the total of Ni and Sn in each of those inner electrodes was 100 mol, an increase of the electrostatic capacitance was proved from a comparison of the electrostatic capacitances in the samples of Sample Nos. 17 to 19 with the electrostatic capacitances in the samples of Sample Nos. 9 and 10.

It is to be noted that the present invention is not limited to the above-described preferred embodiments, and that the present invention may be variously modified without departing from the gist of the present invention.

For instance, while $SnO_2$ is added to the raw material powder, which is used to form the dielectric layer 14, as a method of forming an alloy of Ni and Sn by dissolving Sn in a solid state in Ni of the inner electrode 22 contacting each of the first principal surface-side outer layer section 18a and the second principal surface-side outer layer section 18b, the method is not limited to such an example. As an alternative, the inner electrode contacting the outer layer section may be formed by using an inner-electrode conductive paste, which is prepared by mixing a Sn metal, an alloy containing Sn, or a Sn compound to powder including a Ni—Sn alloy as a main ingredient, to Ni powder, or to alloy powder including Ni as a main ingredient.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A multilayer ceramic capacitor comprising: a multilayer body including a plurality of laminated dielectric layers, a first principal surface and a second principal surface opposing to each other in a lamination direction, a first lateral surface and a second lateral surface opposing to each other in a width direction perpendicular or substantially perpendicular to the lamination direction, and a first end surface and a second end surface opposing to each other in a length direction perpendicular or substantially perpendicular to the lamination direction and the width direction;

first inner electrodes and second inner electrodes alternately laminated with the dielectric layers each interposed therebetween, and exposed respectively at the first end surface and the second end surface; and a first outer electrode connected to the first inner electrodes and disposed on the first end surface, and a second outer electrode connected to the second inner electrodes and disposed on the second end surface;

wherein the multilayer body includes:

an inner layer section extending from the first inner electrode or the second inner electrode positioned closest to the first principal surface to the first inner electrode or the second inner electrode positioned closest to the second principal surface in the lamination direction;

a first principal surface-side outer layer section that is positioned closer to the first principal surface, and that is defined by dielectric layers of the plurality of dielectric layers positioned between the first principal surface and an outermost surface of the inner layer section on a side closer to the first principal surface; and a second principal surface-side outer layer section that is positioned closer to the second principal surface, and that is defined by dielectric layers of the plurality of dielectric layers positioned between the second principal surface and an outermost surface of the inner layer section on a side closer to the second principal surface;

Sn is dissolved in a solid state in Ni of only the first and second inner electrodes positioned in the inner layer section and contacting the first principal surface-side outer layer section and the second principal surface-side outer layer section; and a Sn content is not less than about 0.1 mol and not more than about 8.5 mol where a total of Ni and Sn in each of the first and second inner electrodes contacting the first principal surface-side outer layer section and the second principal surface-side outer layer section is 100 mol.

2. The multilayer ceramic capacitor according to claim 1, wherein the Sn content is not less than about 1.0 mol and not more than about 8.5 mol where the total of Ni and Sn in each of the first and second inner electrodes contacting the first principal surface-side outer layer section and the second principal surface-side outer layer section is 100 mol.

3. The multilayer ceramic capacitor according to claim 1, wherein the plurality of dielectric layers are made of a dielectric material including, as a main ingredient, a perovskite oxide including Ba and Ti.

4. The multilayer ceramic capacitor according to claim 3, wherein the dielectric material includes at least one of a Mn compound, a Fe compound, a Cr compound, a Co compound, and a Ni compound at a content smaller than that of the main ingredient.

5. The multilayer ceramic capacitor according to claim 1, wherein each of the first and second inner electrodes includes dielectric particles with a same composition series as a ceramic included in the plurality of dielectric layers.

6. The multilayer ceramic capacitor according to claim 1, wherein a thickness of each of the first and second inner electrodes is not less than about 0.2 µm and not more than about 2.0 µm.

* * * * *